INVENTORS
W. SCHMITT
A. TONIK
BY Morton C. Jacobs
ATTORNEY

Oct. 19, 1965 W. F. SCHMITT ETAL 3,213,427

TRACING MODE

Filed July 25, 1960 13 Sheets-Sheet 2

INVENTORS
W. SCHMITT
A. TONIK

BY Milton C. Jacobs

ATTORNEY

Oct. 19, 1965 W. F. SCHMITT ETAL 3,213,427

TRACING MODE

Filed July 25, 1960 13 Sheets-Sheet 3

INVENTORS
W. SCHMITT
A. TONIK
BY Milton C. Jacobs
ATTORNEY

INVENTORS
W. SCHMITT
A. TONIK
BY Morton C. Jacobs
ATTORNEY

INVENTORS
W. SCHMITT
A. TONIK
BY [signature]
ATTORNEY

Oct. 19, 1965 W. F. SCHMITT ETAL 3,213,427

TRACING MODE

Filed July 25, 1960 13 Sheets-Sheet 6

INVENTORS
W. SCHMITT
A. TONIK

BY

ATTORNEY

INVENTORS
W. SCHMITT
A. TONIK
BY
ATTORNEY

TRACING MODE

Filed July 25, 1960 13 Sheets-Sheet 8

NORMAL INSTRUCTION

LEGEND:
N-ADDRESS OF INSTRUCTION N
(N)-CONTENTS OF MEMORY LOCATION N
M'N-M PORTION OF INST. N
BN-A ADDRESS OF REGISTER BN
(BN)-CONTENTS OF REGISTER BN
AN-ADDRESS OF REGISTER AN
(AN)-CONTENTS OF REGISTER AN
MN-MN+(BN)
(AN)-RESULT OF COMPUTATION

INVENTORS
W. SCHMITT
A. TONIK
BY [signature]
ATTORNEY

TRANSFER INSTRUCTION
90 ORDER

LEGEND: N - ADDRESS OF INSTRUCTION N
(N) - CONTENTS OF MEMORY LOCATION N
M'N - M PORTION OF INST. N
BN - ADDRESS OF REGISTER BN
(BN) - CONTROLS OF REGISTER BN
AN - ADDRESS OF REGISTER AN
(AN) - CONTENTS OF REGISTER AN
MN - MN+(BN)

INVENTORS
W. SCHMITT
A. TONIK
BY [signature]
ATTORNEY

TRANSFER INSTRUCTION
91 ORDER

LEGEND: N- ADDRESS OF INSTRUCTION N
(N)- CONTENTS OF MEMORY LOCATION N
M'N-M PORTION OF INST. N
BN- ADDRESS OF REGISTER BN
(BN)-CONTROLS OF REGISTER BN
AN-ADDRESS OF REGISTER AN
(AN)-CONTENTS OF REGISTER AN
MN-MN+(BN)

INVENTORS
W. SCHMITT
A. TONIK

BY [signature]
ATTORNEY

TRACING MODE

Filed July 25, 1960

SET FF INSTRUCTION
97 ORDER

LEGEND: N-ADDRESS OF INSTRUCTION N
(N)-CONTENTS OF MEMORY LOCATION N
M'N-M PORTION OF INST. N
BN-ADDRESS OF REGISTER BN
(BN)-CONTENTS OF REGISTER BN
AN-ADDRESS OF REGISTER AN
(AN)-CONTENTS OF REGISTER AN
MN-M'N+(BN)

INVENTORS
W. SCHMITT
A. TONIK
BY [signature]
ATTORNEY

TRACING MODE

Filed July 25, 1960 13 Sheets-Sheet 12

TEST INSTRUCTION (95)

LEGEND:
N - ADDRESS OF INSTRUCTION N
(N) - CONTENTS OF MEMORY LOCATION N
M'N - M PORTION OF INST. N
BN - ADDRESS OF REGISTER BN
(BN) - CONTROLS OF REGISTER BN
AN - ADDRESS OF REGISTER AN
(AN) - CONTENTS OF REGISTER AN
MN - MN+(BN)

INVENTORS
W. SCHMITT
A. TONIK
BY Milton C. Jacobs
ATTORNEY

TRACING INSTRUCTION

LEGEND: N - ADDRESS OF INSTRUCTION N
(N) - CONTENTS OF MEMORY LOCATION N
MN - M PORTION OF INST. N
BN - ADDRESS OF REGISTER BN
(BN) - CONTROLS OF REGISTER BN
AN - ADDRESS OF REGISTER AN
(AN) - CONTENTS OF REGISTER AN
MN - MN-MN+(BN)

INVENTORS
W. SCHMITT
A. TONIK

BY Maton C. Jacobs
ATTORNEY

United States Patent Office 3,213,427

Patented Oct. 19, 1965

3,213,427

TRACING MODE

William F. Schmitt, Wayne, and Albert B. Tonik, Philadelphia, Pa., assignors to Sperry Rand Corporation, New York, N.Y., a corporation of Delaware Filed July 25, 1960, Ser. No. 45,158
6 Claims. (Cl. 340—172.5)

This invention relates to an improvement in digital computers having an internally stored program.

Stored program digital computers are characterized by the provision of memory elements which store both operating instructions and data to be operated on. In general, the stored instructions are extracted from the memory in a regular sequence, or in a sequence determined by the instructions themselves. This sequence of instructions may be varied by the occurrence of certain events as computations proceed, causing the extraction from the memory of a new instruction out of the regular sequence.

The present invention further advances the computer art by providing apparatus within a computer for the generation of new instructions by the computer as distinguished from the extraction of programmed instructions from the memory. Such new instructions will be generated upon the occurrence of certain events. In a preferred embodiment of the invention the instructions extracted from the memory themselves contain an indicia of the event upon which a new instruction is generated.

As is well known, instructions within an internally stored program digital computer comprise a plurality of digits. Some of these digits are used to designate the actual operation to be performed, such as for example, add, subtract, compare, shift, sort etc. Other digits determine addresses in the memory of data to be manipulated in accordance with the operation digits. Still other digits may designate the address within the memory where results of operations are to be stored. Further digits may be employed to designate the memory address of other instructions. The present invention utilizes yet another digit within an instruction which serves to determine in part when the computer itself will be called upon to generate an order. This further digit will be henceforth referred to as the tracing or monitor digit.

Within the machine itself are provided a plurality of addressable switches or storage elements which cooperate with the information represented by the tracing or monitor digit of the instruction to enable the computer to generate the new instruction as referred to hereinabove. Any number of these addressable switches may be set by the operator to store an indicia which when correspondence has been established between such indicia and the number appearing in the tracing or monitor digit will activate further circuits to effect the generation of the new instruction. In this arrangement, the addressable switches or storage elements serve as a mask. The appearance of a tracing digit in an instruction, in the event that an addressable switch corresponding thereto has been set, will generate a signal to be sent to the control circuits to cause the generation of the new instruction. Assuming that nine addressable switches or storage elements are provided, then if none of these are set the appearance of a tracing digit in a subsequent instruction will have no effect. However, assume further that number 3 and number 5 of these storage elements have previously been set by the operator. Then the appearance in a subsequent instruction of either a 3 or a 5 in the tracing digit thereof will be detected by this masking arrangement so as to generate the new instruction. It will be generally appreciated that the setting of an addressable switch in itself or the appearance of a tracing digit in an instruction of itself are conditions insufficient to generate the new instruction. Only when the tracing digit has been detected by the masking arrangement of addressable storage elements does the computer generate the new order.

In a preferred embodiment of the invention the instructions are normally extracted from the memory in a sequence determined by a sequential counter. When an instruction contains information in its tracing or monitor digit corresponding to the set condition of a related addressable switch, the instruction containing the tracing digit is not executed. Instead the new instruction is generated by the computer. While such new instruction may take diverse forms, in the present embodiment a transfer of control or jump supplants the instruction which caused the generation thereof. Such transfer of control is effective to store in the memory the address (plus a constant) of the instruction causing the generation of the new order and also forces the computer to seek its new instruction from a designated segment of the memory. Such designated segment of the memory will contain routines set up by the machine operator which will effect a variety of displays or tests.

Displays and tests are useful in diagnosis of programs internally stored in the memory by the operator. The diagnostic routines may take many different forms. One example would be to list the contents of various registers. Another example might be the providing of information concerning a predetermined number of previously performed jumps or transfers. Such diagnostic routines may be desirable for many different types of instructions. For example, the operator of the computer may provide all instructions of the same class, i.e., multiplication, with the same tracing digit. Thus, all multiplication orders could have 9 for a tracing digit, all division orders could have 5 for a tracing digit, all conditional jumps or transfers could have 2 for a tracing digit. Alternatively, within a given routine as, for example, a matrix multiplication involving several different types of instructions, it might be desirable to provide several instructions of different natures (e.g., add and multiply) with the same tracing or monitor digit so that within these sub-routines tracing could be effected dealing with machine operation at various stages of the sub-routine. If in the course of computer operation it should be desirable to examine in detail the operation of the computer for a given class of instructions or for a variety of classes of instructions falling within a certain routine it is only necessary for the operator to set the addressable switch or storage element corresponding to the monitor or tracing digit of the class of instructions or of the instructions falling within the sub-routine. Thereafter, each time an instruction containing the tracing or monitor digit corresponding to the set addressable switch is extracted from the memory the computer will generate the new instruction to effect the diagnostic routine. It will be apparent since a number of addressable switches or storage elements are provided that a plurality of different classes of instructions or a plurality of different sub-routines may be diagnosed as they appear in a program.

The advantages of the invention will be readily apparent to operators, programmers and others concerned with the application of digital computers to the solution of problems arising either in commercial or scientific applications. Thus, when it is realized that in a program involving 100,000 instructions there are millions of possibilities for crippling errors, the facility herein provided for the diagnostic operation becomes extremely important for determining how and when an error has occurred in programming or computer operation. In view of the high cost of computer operation time the invention effects important economies in trouble shooting operations. There is no need to stop a program for the purpose of inserting diagnostic routines and extreme flexibility is obtained in view of the plurality of addressable switches or storage elements. From this latter consideration it is apparent that by tagging instructions with different tracing digits one is enabled to pick out different sets of instructions as they may occur in different sub-routines for tracing. A further advantage of the invention is realized when it is considered that upon entering a sub-routine a tracing routine may be initiated as a means of keeping track of the number of times such sub-routine is used. An operator is thereby enabled to learn more about the program, particularly the time required and the number of steps required involving separate sub-routines. Accordingly, by the use of the tracing or monitor digit and the masking for the detection thereof, it is frequently possible to effect greater efficiency in machine operation by the revision of sub-routines frequently encountered so as to render such sub-routines more efficient in terms of machine time.

Accordingly, it is an object of the invention to provide a new and improved digital computer having internally stored programs.

A further object of the invention is the provision within a digital computer of means for the generation of instructions as distinguished from the extraction of such instructions from a memory.

A still further object of the invention is the provision of means within a digital computer for the generation of an instruction upon the occurrence of a certain event.

Another object of the invention is the provision within a digital computer of a plurality of addressable switches or storage elements to form a mask the condition of which constitutes a factor in the change of control of the computer.

A still further object of the invention is the provision within a digital computer of a plurality of storage elements the condition of which may be tested to determine future computer routines.

Another object of the invention is the provision within a digital computer of means for diagnosing programs and sub-routines which automatically changes the computer from any program to a diagnostic program.

Still another object of the invention is the provision within a digital computer of means for rapidly and efficiently gaining access to a large number of diagnostic routines.

Other objects and advantages of the present invention will be made apparent as this description proceeds. For a fuller understanding of the invention reference is made to the drawings in which corresponding parts are referenced by the same numerals and of which:

FIGURE 1 is a general block diagram representative of the organization of a digital computer employing the present invention;

FIGURES 1*a* and 1*b* comprise two sheets which when assembled as indicated provide a detailed block diagram of a general purpose digital computer employing the present invention;

FIGURE 2 is a diagrammatic representation of certain details of the control circuits of FIGURE 1;

FIGURES 3*a* and 3*b* when assembled are a diagrammatic representation of the details of certain portions of FIGURE 2 and specifically show means for generating function signals as required for the operation of the overall circuit of FIGURE 1*a*;

Figure 9:
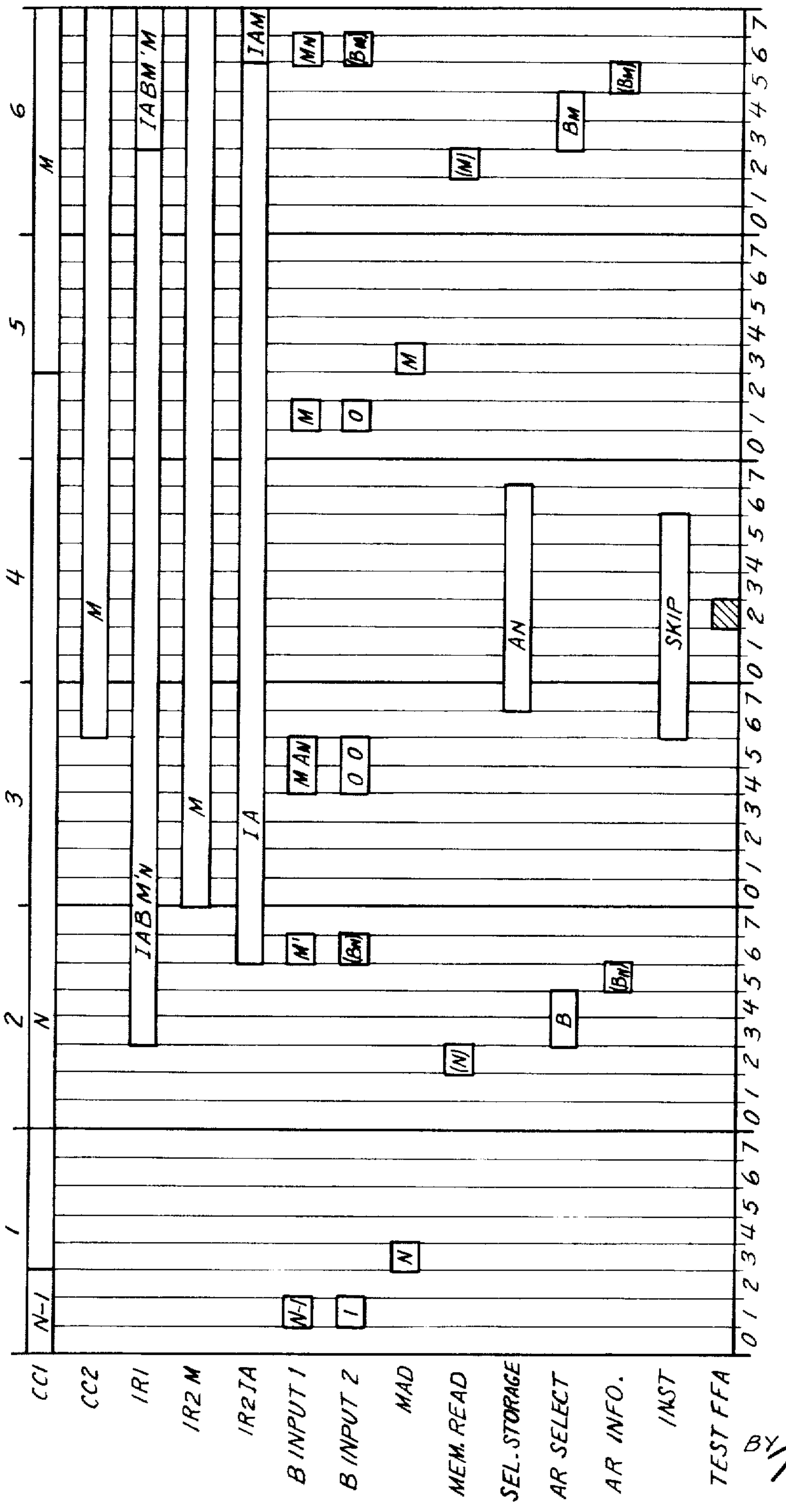
Figure 10:
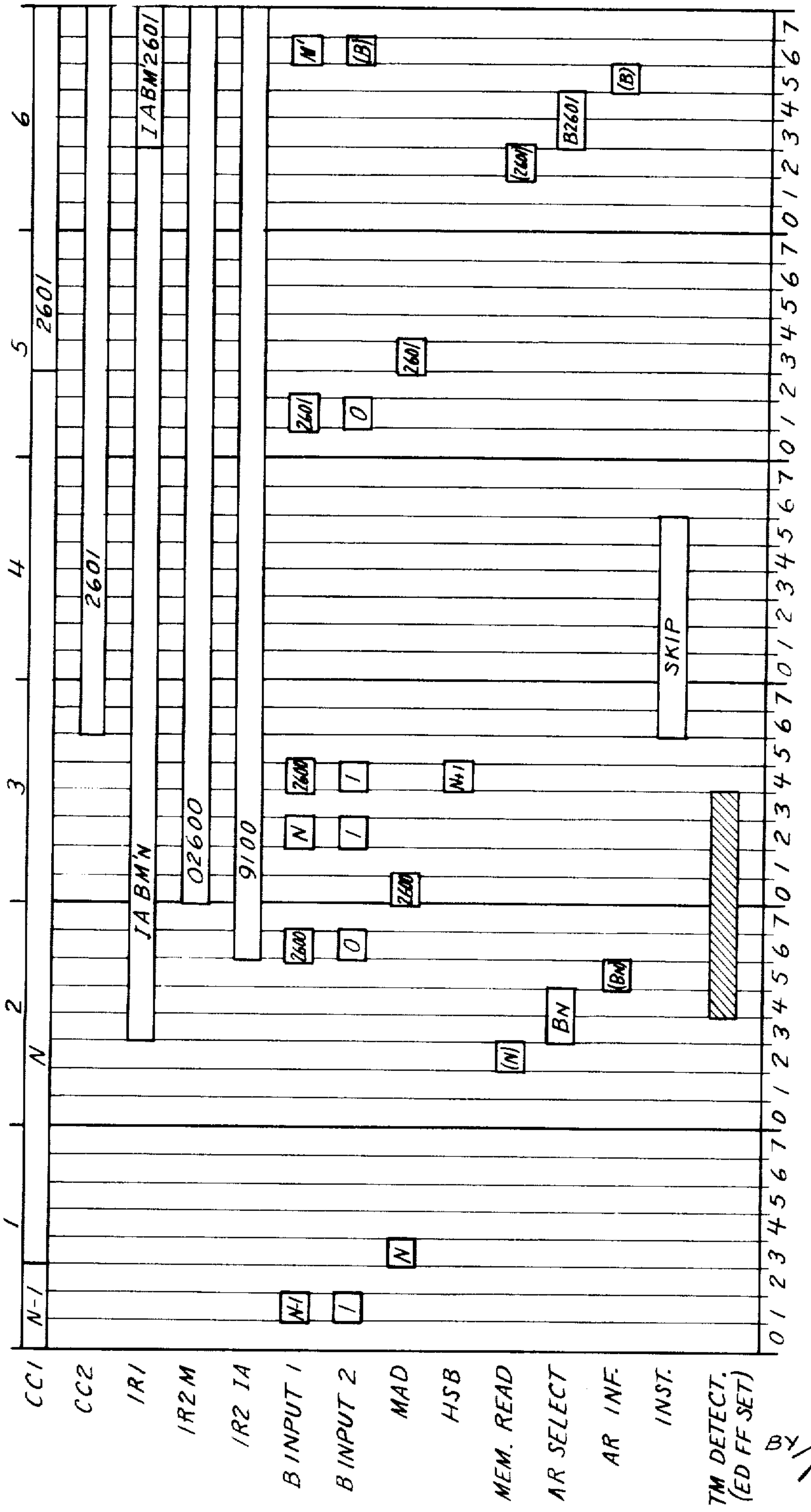

FIGURE 9 is a timing diagram showing the sequence of events on a conditional transfer instruction concerned with the testing of an addressable flip-flop; and FIGURE 10 is a timing diagram showing the sequence of events occurring when an unconditional transfer of control instruction is generated upon coincidence of the set condition of an addressable flip-flop with the value of a monitor or tracing digit appearing in an instruction and the detection of such coincidence.

This invention as described is embodied in a large-scale high-speed digital computer. Applications of the invention to other and smaller computers involving different systems and components are within the scope of the invention as will be apparent from the following description.

Figure 1:
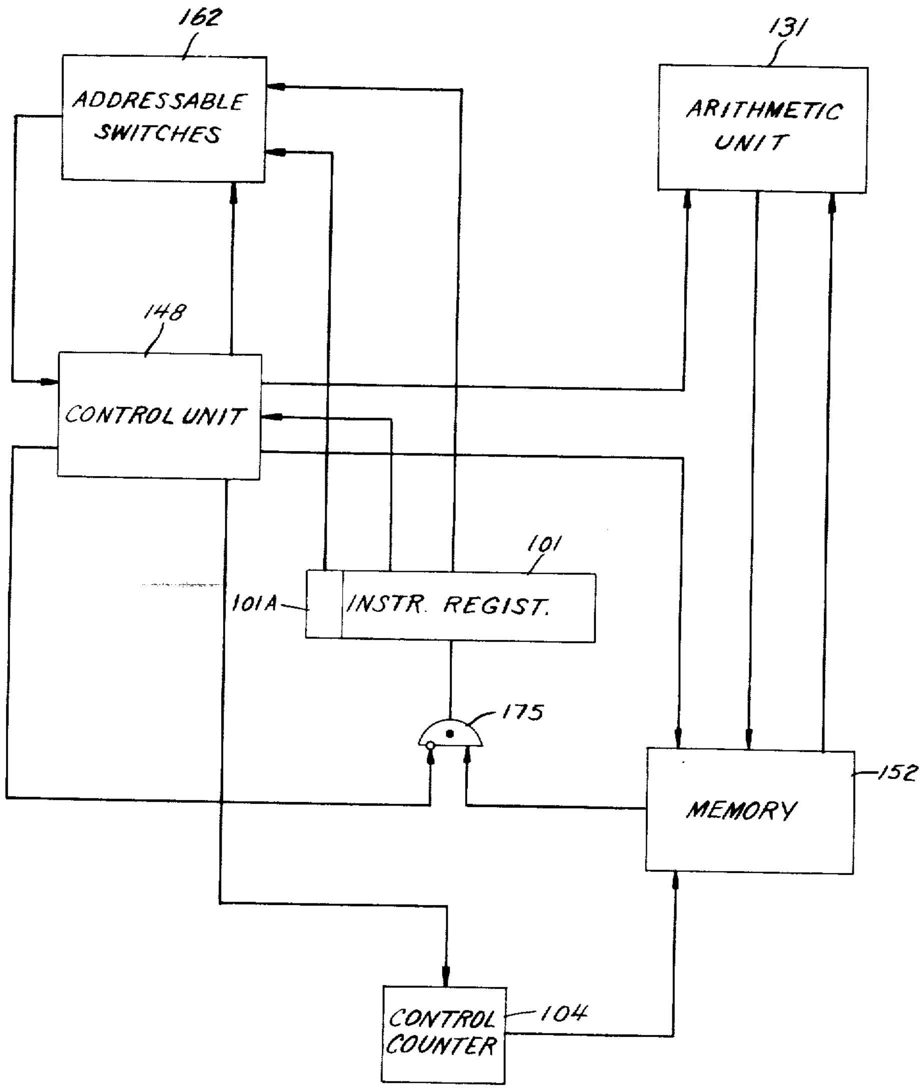

In general terms, the organization of a stored program digital computer embodying this invention is shown in FIGURE 1. In such a computer both instructions and operands are stored in a memory. In FIGURE 1, the memory apepars as block 152. Each word stored in the memory has associated therewith a unique address whereby it is possible to send signals corresponding to such an address to the memory and either place information therein or extract information therefrom either in the form of operands or instructions. An appropriate form of memory would be a random access coincident-current magnetic core memory such as that described in U.S. Patent No. 2,931,016.

Another segment of a computer is an arithmetic unit which appears on FIGURE 1 as block 131 and is shown as connected to the memory as well as to the other blocks. The arithmetic unit upon receiving instructions will carry out computations involving operands stored in the memory.

The control circuits generally comprise registers operating in conjunction with timing circuits, decoding circuits and encoding circuits so that instructions when received may produce all of the various control signals required at various times to enable the progression of information through the various circuits. On FIGURE 1 the control circuits involve general block 148 the further details of which are found in FIGURES 2 and 3.

In order that a regular progression of instructions may be extracted from the memory and supplied to the computer, control counter 104 is provided. This element, since it controls the sequencing of instructions, is also involved during a transfer of control from one sequence of instructions to another sequence.

Control counter 104 has its output connected to memory 152. An input to control counter 104 is derived from the control unit 148 whereby the sequencing of such control counter may be determined. As previously noted the control counter is effective to extract instructions from the memory and supply them to the computer. Accordingly, memory 152 has an output thereof connected to the instruction register 101 via gate 175. An output of instruction register 101 is connected to the control unit 148 so that upon receipt of an instruction in the instruction register 101, the instruction portion thereof may be supplied to the control unit thereby to derive the required control signals.

The memory also has an output thereof connected to the arithmetic unit 131. The output of the arithmetic unit 131 is also connected to an input of the memory. Thus, it is possible to transmit operands from the memory to the arithmetic unit 131, perform the required operations on such operands and thereafter return the results of these operations to the memory for storage. These various operations are determined by the control unit 148 an output of which is connected to the arithmetic unit 131.

One feature of the present invention is the block of addressable switches 162 further details of which appear in FIGURE 3. The instruction register 101 is connected to the group of addressable switches 162. In particular a specific section 101A of instruction register 101 is additionally connected to the addressable switches 162, and this section is used to store a "tracing" digit.

Upon receipt of an instruction requiring the setting of an addressable switch in block 162 the required control signals are derived from control unit 148 and the address of the particular switch which is to be set is derived from instruction register 101. While the present invention is more particularly directed to the setting of an addressable switch by means of programmed instructions it is clearly within the scope of the application that such switches may be manually set from an operator's console (not shown).

An output from the block of addressable switches 162 is connected to the input of the control unit 148. A further output of control unit 148 is connected to the input of instruction register 101 and to an inhibit input on gate 175.

The tracing digit of an instruction stored in the tracing section 101A of the instruction register is sent to the addressable switches 162. If coincidence is established between this particular digit and the set condition of its corresponding addressable switch an output will be derived from the addressable switches 162 and this, in turn, is sent to the control unit 148. Thereafter, control unit 148 is effective to generate a new instruction. This new instruction is transmitted to the instruction register 101 and at the same time is effective to inhibit the placing of an instruction therein in the regular sequence as derived via the memory 152 and the control counter 104. The inhibition is accomplished through the use of gate 175. As will be subsequently disclosed the artificially generated instruction may be a transfer of control instruction.

Figure 1A:
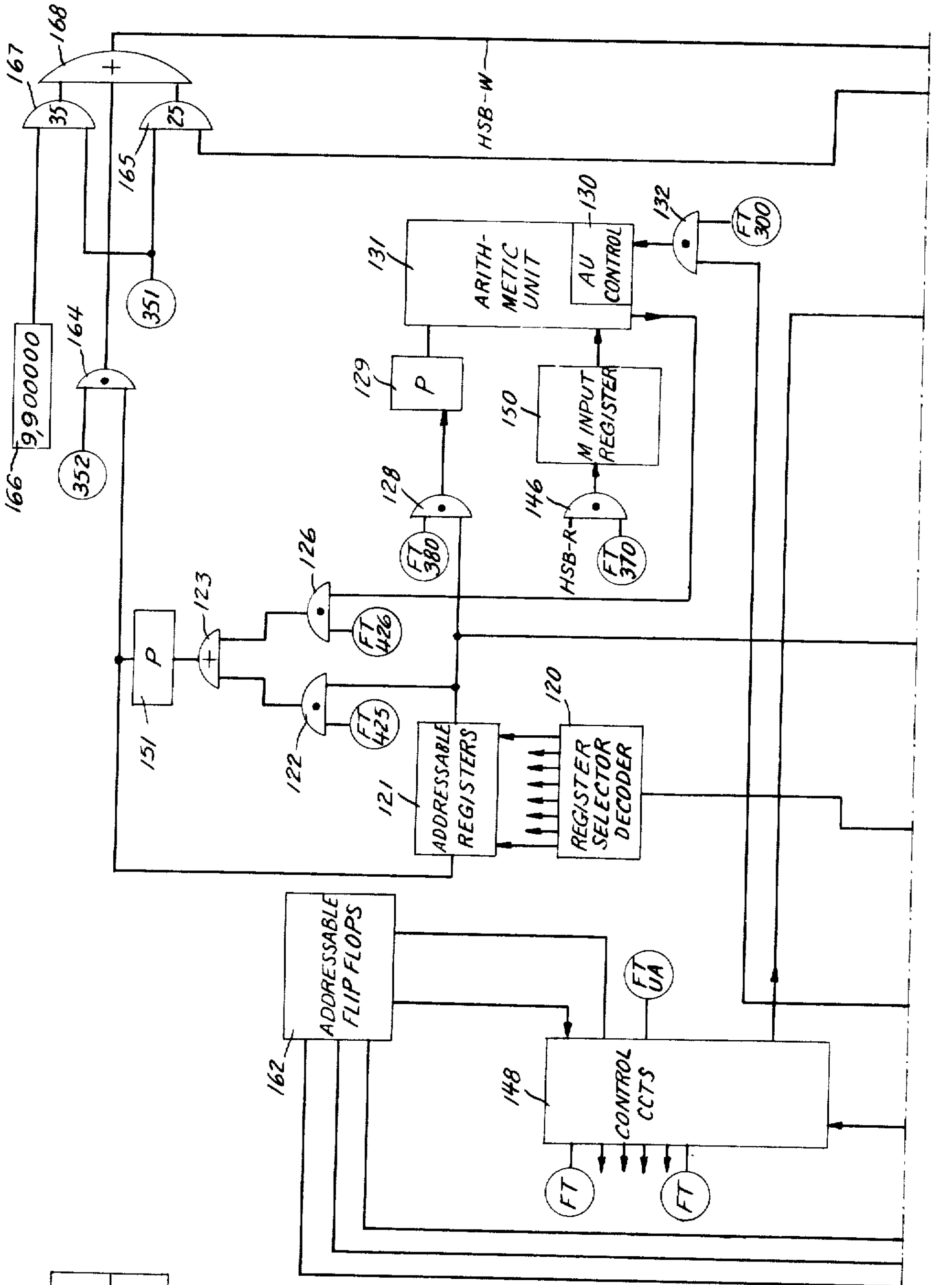
Figure 1A:
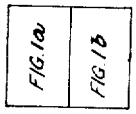
Figure 1B:
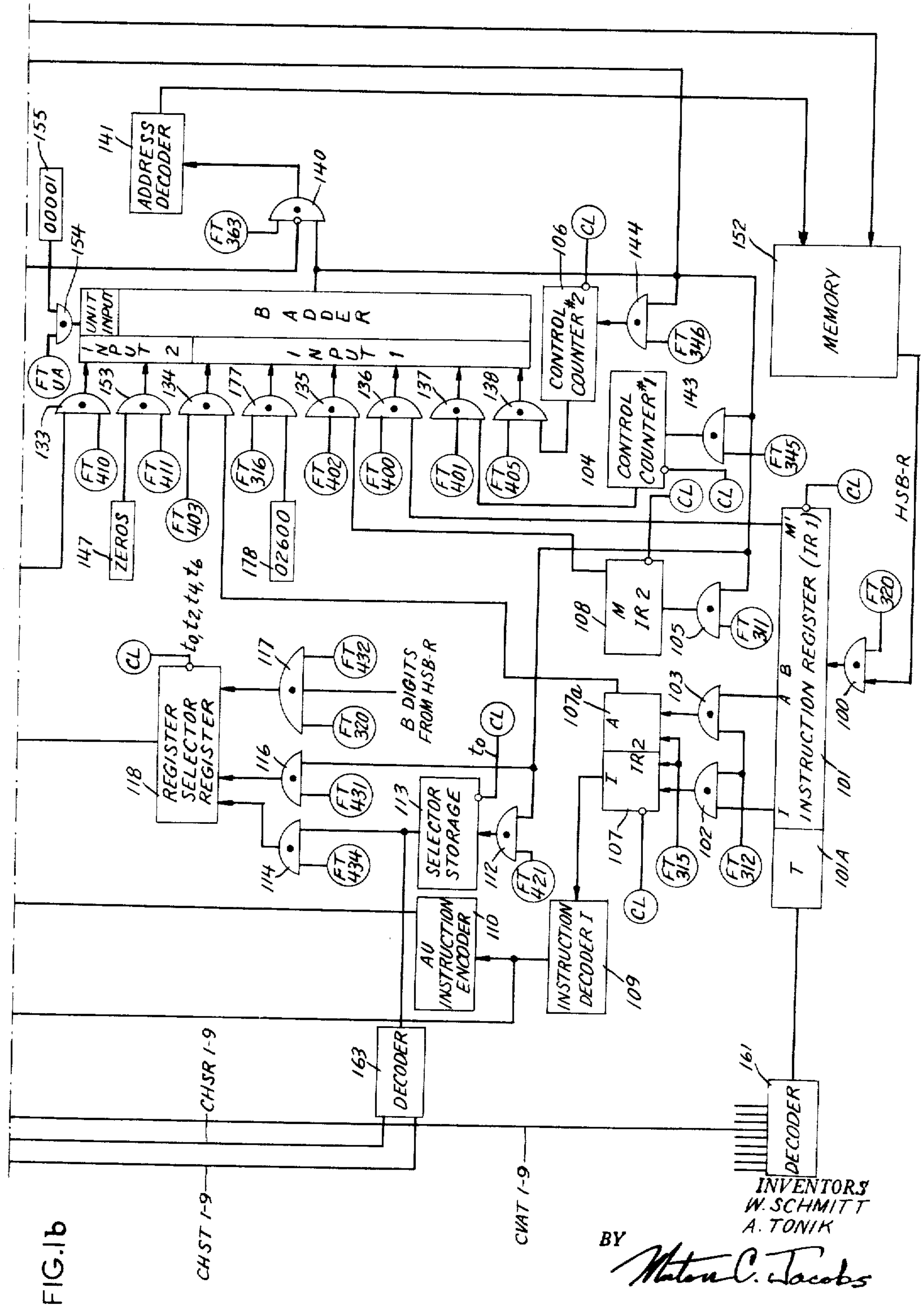

Consider now the details of the block diagram of the invention as embodied in FIGURE 1*a*. In FIGURE 1*a*, coincident ("and") gates are indicated throughout by a half moon configuration with a dot in the center thereof. Where buffers ("or" gates) are required they are similarly indicated by a half moon but in such case a plus sign is found in the center thereof. The computer embodiment of FIGURE 1 operates in the parallel mode, that is to say, electrical signals representative of an entire computer word are simultaneously transmitted through the various elements. This is by way of contrast with a serially operated computer in which individual binary digits forming words are transmitted serially in time through the various machine elements. Since, as mentioned, the present machine operates in parallel in many instances single lines actually appearing in the various figures are actually representative of many lines. The length of the word transmitted in parallel is twelve decimal digits, of which the most significant may be a sign digit. Each digit in turn is represented by five bits. The coding may be any one of a well known number of codes such as the 8–4–2–1 or 5–4–2–1 (biquinary) codes. The fifth bit is used for checking purposes. The entire word therefore is represented by sixty bits. Thus, gate 100 connecting the memory to instruction register 101 actually comprises sixty gates. Similarly, gates 102 and 103 connecting IR–1 and IR–2 actually represent ten gates for transmitting two decimal digits (10 bits) each and gate 105 represents twenty-five gates for transmitting five decimal digits (25 bits). Since B-adder 139 accommodates five decimal digits in parallel, each of the input gates thereto is representative of twenty-five gates although for certain inputs only the first or first and second least significant digit positions ever contain digits other than zeros. Other variations are transmission of one decimal digit (5 bits) and transmission of control signals via a single control line. The number of signal lines represented by a single illustrated line and the number of gates represented by a single illustrated gate will be apparent from the following description in each instance.

Control counter 1 (104), has the output thereof connected via gate 137 to input 1 of the B-adder 139. The B-adder 139 is used in conjunction with the aforesaid control counter 1 to step progressively the contents of the control counter whereby a regular succession of numbers representing the addresses of a succession of instructions is indicated by such control counter. The output of B-adder 139 (25 lines) is connected back to the input of control counter 1 (104) via gates 143 (25 gates); thereby a number in control counter 1 (104) is applied to the B-adder 139 augmented by unity, and restored in control counter 1. Appropriate function signals (represented in circles by the prefix FT) for providing permissive signals to the various gates involved are developed in accordance with the details of FIGURE 3 and will be discussed hereinafter.

The output of the B-adder 139 (25 lines) is also connected by way of gates 140 (25 gates) to the address decoder 141, the output of which is in turn connected to the memory 152. Thus, addressing the memory is done from control counter 1 (104) by way of the B-adder 139 and the address decoder 141 so that a series of instructions may be called out of the memory.

The memory 152 in practice may be divided into ten cabinets each of which is individually addressed. The 5 digit memory address, MMMMM, is interpreted by the address decoder 141 in a manner suitable for addressing the memory 152. For example, the two least significant decimal digits may be used for the X select, the next 2 decimal digits for Y select and the most significant decimal digit for cabinet select. The one decimal digit for selecting the memory cabinets determines to which of the ten cabinets the X and Y digits are applied. The X and Y digits are used in a coordinate selection system of a conventional type for a coincident-current magnetic memory. The two X digits may assume the values of 00–99 as may the Y digits which provide a total of 10,000 possible coordinate positions within each cabinet. Each selected memory location provides space for 60 bits of storage for a complete word; these 60 bits, as is customary, are made available at corresponding points of 60 parallel memory planes, the corresponding points of which are all selected by a single set of X and Y digits. The driving of the memory by X and Y digit signals performs a read out of one word from the selected memory onto the HSB–R in the form of 60 bits in parallel. To write in the memory, the information is supplied on the HSB–W during the same time X and Y digit signals are supplied.

The output of memory 152 is connected to the input of the first instruction register (IR–1) 101 by way of the read high speed bus, HSB–R, and gates 100. Thus, an instruction as called for from the control counter 104 may be transmitted from the memory to IR-1. Control counter 2 (106) may also address the memory by way of gates 138, input 1 to the B-adder 139, gate 140 and address decoder 141. Control counter 2 (106) is used to address the memory during the transfer of control operation. The output of B-adder 139 is connected to the input of control counter 106 by way of gates 144 (25 gates).

Certain portions of an instruction word coming from the memory may also be transmitted directly from HSB-R to register selector register 118 by way of gates 117 (10 gates for two coded decimal digits) when appropriate function table signals are received from the control unit. From IR–1 (101) various portions of an instruction received therein are transmitted to further elements. Thus the portion of the instruction word indicated as T is transmitted to decoder 161 and from there to the block of addressable flip-flops 162. The portion of the instruction word indicated as I is transmitted to section 107 of IR–2 (instruction register-2) by way of gates 102 (10 gates). The portion of the instruction word designated A is transmitted to section 107A of IR–2 via gates 103 (10 gates). Finally, the portion designated as M′ is sent to input 1 of the B-adder 139 by way of gates 136 (25 gates). Thus, IR–1 (101) is connected to IR–2 (107, 107A), and B-adder 139.

The output of section 107 of IR–2 is connected to instruction decoder 109 and the output of instruction decoder 109 is in turn connected to AU instruction encoder 110 as well as control circuits 148. The output of AU instruction encoder 110 is connected to the arithmetic unit control 130 by way of gates 132.

The B-adder 139 is provided with three inputs indicated respectively as input 1, input 2 and unit input. To input 1 are connected gates 134, 177, 135, 136, 137 and 138. Gates 137 and 138 are associated respectively with control counters 104 and 106 as hereinbefore described. Gate 136 is connected to IR–1 (101) also as previously described. Gate 135 is connected to section 108 of IR–2 whereby the output of IR–2 may be transmitted through the B-adder when required. Gate 177 has its input connected to register 178 which is effective to supply signals corresponding to coded digits 02600. When an appropriate function table signal is received on gate 177 coded number 02600 is transmitted to input 1 of B-adder 139.

Gates 134 are connected to the output of Section 107A of IR–2 whereby the contents of this section may likewise be transmitted through the B-adder. Input-2 of the B-adder has two input lines associated therewith by way of gates 133 and 153, respectively. Gates 153 have their input connected to zero register 147 which is effective to supply signals corresponding to coded zeros. Thus, when the appropriate function table signal is received on gates 153 a coded zero is transmitted to input-2 of the B-adder 139. The input to gates 133 is connected to the output of addressable registers 121 so that when the appropriate function table signal is received a portion of the contents of the designated addressable register is transmitted to input-2 of the B-adder 139.

The third input of the B-adder is indicated as Unit Input and at appropriate times when the Unit Add (UA) function table signal is applied to gates 154 a coded one (00001) from register 155 is passed into this section of the B-adder 139.

The output of the B-adder 139 in addition to being connected to address decoder 141 and control counters 104 and 106 is connected via gates 105 (25 gates) to the input of section 108 of IR–2. Also the output of the B-adder 139 is connected into the high speed write bus HSB–W via gates 165 (25 gates) and buffer 168. Further the output of the B-adder 139 is connected by way of gates 112 (10 gates) to the input of selector storage 113 and by way of gates 116 (10 gates) to the input of register selector register 118. The output of selector storage 113 is connected to the input of register selector register 118 via gates 114 (10 gates). The output of register selector register 118 is connected to the input of register selector decoder 120 and the output of the register selector decoder is connected to the addressable registers 121 whereby a desired addressable register may be specifically selected.

The addressable registers 121 are of the recirculating type so that when information is read from a selected addressable register it is necessary to restore such information by recirculation. For this purpose a recirculation path is shown which includes gates 122 (60 gates), buffers 123 (60 buffers) and pulse formers 151 (60 pulse formers) connected serially between the output of the block of addressable registers 121 and the input thereof. In order to place results of computations into a selected addressable register an output line from the arithmetic unit 131 is connected into the recirculation path by way of gates 126 (60 gates). From here the information may pass by way of buffers 123 and pulse formers 151 into the selected addressable register in the block 121.

The recirculation path of the addressable registers is also connected from the output of pulse formers 151 into the high speed write bus HSB–W via gates 164 (60 gates) and buffer 168. A further input of the high speed write bus HSB–W is register 166 which stores coded digits 0900000. The contents of register 166 are gated into the high speed write bus HSB–W via gates 167 (35 gates; 5 for each decimal digit) and buffers 168 by the same function signal which is applied to gate 165.

Two informational inputs feed the arithmetic unit 131. One of these originates from the addressable register block 121 and includes gates 128 (60 gates) and pulse formers 129 (60 pulse formers). The other such informational input includes M input register 150 and gates 146 (60 gates) which latter gates are connected to receive information from the memory 152 via HSB–R.

The block of addressable flip-flops 162 is connected to the output of selector storage 113 through decoder 163. A further input to addressable flip-flops 162, as previously noted, is derived from section 101A of the first instruction register via a decoder 161. Control input to the addressable flip-flops 162 is taken from the control circuits which upon suitable instructions being received thereby are effective to set or reset a particular one of these flip-flops. An output from the block of addressable flip-flops 162 is connected into the control circuits whereby conditional transfer signals may be generated by the control circuits whenever a signal occurs on such output line.

Before discussing in detail the operation of the computer on an ordinary instruction and indicating the function performed by the various elements as described hereinabove, the form of an instruction will now be set forth. Both operand words and instruction words have a twelve decimal digit format (5 bits per digit to form a 60 bit word). In the case of operand words the most significant digit position is reserved for a sign; however, in the case of an instruction word the aforesaid most significant digit position is referred to as the T digit. It is the interpretation of this T digit and the subsequent operations of the computer in accordance with such interpretation that the present invention is mainly concerned. The instruction word therefore has the following format:

T II AA BB MMMMM

The T digit has tracing values of 1 to 9, when any other code representation for T is used in an instruction it has no meaning and will be treated as "no digit." Herein the T digit upon being decoded and sent to the addressable flip-flops is effective to determine subsequent operations within the computer and may, provided that an addressable flip-flop corresponding thereto has previously been set, generate a transfer of control instruction to be subsequently stuffed into IR–2.

The I digits specify the operation to be performed by the computer such as add, subtract, multiply, shift, etc. Since the computer operates in a binary coded decimal mode it is evident that up to one hundred different commands may be provided by the aforesaid I digits.

The A digits refer to the address of an addressable register in block 121 or to the address of an addressable flip-flop in block 162. Such digits are used to specify a register from the block 121 in FIGURE 1*a* from which it is desired to extract an operand to be operated on or to specify which such addressable register is to be used to store a result coming from the arithmetic unit 131. Also the A digits upon being passed into selector storage 113 serve to specify the address of one of the addressable flip-flops of block 162. Since there are two A digits it is evident that 100 addressable registers and 100 addressable flip-flops may be provided.

The B digits specify an address of one of the addressable registers 121. When through the use of the B digits an addressable register is selected a different operation is performed than in the case where said register is selected by the A digits. In the case of addressing a register by B digits a portion of the contents of such register are used to modify the M digits of that instruction which contained the aforesaid B digits. A general discussion of B modification, its objects and advantages and specific apparatus associated therewith is beyond the scope of the present application. For further details reference should be made to U.S. patent application No. 45,242 entitled, "Computer Indexing System."

The M digits of the instruction refer to the address in the memory of either an operand or an instruction. These digits may be altered by the addition thereto or the subtraction therefrom of the aforesaid partial contents of an addressable register in block 121 as selected by the B digits of the same instruction.

The computer of the invention has been designed to operate on a cycle of eight pulses. That is to say eight pulse times are required to address the memory and extract a word therefrom. These pulses are numbered from 0 to 7 and one such group of pulses is referred to as a minor cycle. In carrying out instructions on this machine, basic instructions and those instructions with which the present invention is more particularly concerned require four minor cycles from the time they are called for until such time as they have been executed and the results therefrom stored.

Consider now the operation of the various components of FIGURE 1 when the machine is required to execute a basic instruction such as, for example, an addition. For this purpose reference is made to FIGURE 1*a* in conjunction with FIGURE 5 which latter figure shows the basic sequence of events in the progression of instructions and information throughout the various components. It should be noted that FIGURE 5 as well as the other timing diagrams indicates times at which registers and the like have information actually set up therein. Since one pulse time is required to set up a register or flip-flop, it will be apparent that events involving register set ups will show on the timing diagrams as occurring one pulse time later than the function table signals (FT) causing such events.

When the machine is initially started, as will be made manifest in subsequent discussions of FIGURES 2 and 3, the first instruction will be called for. Such call for an instruction is made by furnishing function table signals FT401 and FT411 to gates 137 and 153, respectively, at $t_0$ of the first minor cycle, whereby the contents of control counter 1 (104) are read into input-1 of B-adder 139 while zeros are read into input-2 of the aforesaid B-adder. This call from the control counter 104 is established in the B-adder inputs at $t_1$ of the first minor cycle. The B-adder 139 because of the presence of pulse formers therein operates with two pulse times elapse between the input of information thereto and the obtaining of a result therefrom. The original contents of the control counter 104 appear at the output of the B-adder unchanged inasmuch as zeros have been added thereto. At time $t_2$ of the first minor cycle the function table signal FT363 is placed on gate 140 whereby the B-adder output is passed through to be established in address decoder 141 at $t_3$, decoded therein and subsequently passed to the memory thereby to specify the memory location from which the first instruction is to be extracted.

The contents (N) of the selected memory location N are available at $t_2$ of the second minor cycle and appear on the Read High Speed Bus line HSB–R leading from the memory to gate 100. A function table signal FT320 applied to gate 100 enables the instruction word to be read into IR–1 (101). It is assumed that no T digit occurs for the basic add instruction presently under consideration. It will be noted that the same function table signal FT320 appears on gate 117 and with the appearance, in addition, of the function table signal FT432 the B digits of the instruction are read directly from the high speed bus HSB–R from the memory 152 into the addressable register selector register 118. On FIGURE 5 it will be noted that during times $t_3$ and $t_4$ the B digits of the instruction word are stored in the register selector register 118 from where they are decoded in register selector decoder 120 to select one of the addressable registers 121 the contents of which are required for the next step in the cycle.

A time $t_5$ of the second minor cycle the contents of the addressable register selected by the aforesaid B digits are available and at $t_5$ function table signal FT410 is applied to gate 133, whereby the portion comprising the five least significant digits of the selected addressable register are established at $t_6$ in input-2 of the B-adder 139. Also at $t_5$ function table signal FT400 is applied to gate 136 thereby allowing the M digits contained in IR–1 (101) and presently expressed as M′ to be applied to input-1 of the B-adder 139. Also occurring at this time is the function table signal FT312 which enables the I and A instruction digits storde in IR–1 to be passed via gates 102 and 103 respectively into sections 107 and 107A of IR–2 respectively.

During $t_7$ of the second minor cycle the M digits as now altered by the addition thereto of the contents of the selected addressable register as hereinbefore noted are available at the output of B-adder 139 and again function table signal FT363 is applied to gate 140 whence the altered digits are established at the next $t_0$ in decoder 141 to address the memory 152 for the selection therefrom of an operand. Also at $t_7$ function table signal FT311 will be applied to gate 105 whereby the same M digits are read into section 108 or IR–2.

The situation now existing within the computer is thus: the instruction digits II are in section 107 of IR–2 from which they may be decoded by instruction decoder 109 and sent to the control circuits 148 therein to develop further function table signals as required; the A digits are in section 107A of IR–2; and the modified M digits, which specify the operand address, have been sent to the memory to call for that operand and also have been stored in section 108 or IR–2.

Referring again to FIGURE 5 it will be noted that at $t_3$ of the third minor cycle the A digits of the instruction are established in input-1 of B-adder 139 while zeros are established in input-2 of the aforesaid B-adder, by means of the gating action at $t_2$ of FT403 and FT411. The output of the B-adder is thereafter gated through gate 115 into register selector register 118 by the application of function signal FT431. It will be seen from the timing diagram that the A digits are held in register selector register 118 during pulse times $t_5$ and $t_6$ of the third minor cycle. It will be observed from FIGURE 1 with reference to register selector register 118 that clearing pulses are supplied thereto at pulse times $t_0$, $t_2$, $t_4$, and $t_6$, whereby such register will be cleared at $t_1$, $t_3$, $t_5$ and $t_7$. From register selector register 118 the A digits stored therein are decoded in register selector decoder 120 and the addressable register selected thereby is read out at time $t_7$ of the third minor cycle. The contents of this A register are an operand supplied to the AU 131 together with the operand called for from the memory 152.

At $t_5$ of the third minor cycle the function table signal FT300 is produced by the control circuits and the effect of this is to permit gate 132 to pass into the Arithmetic Unit Control 130 signals corresponding to the I digits as encoded by instruction encoder 110. It will be noted from the timing diagram that the encoded instruction signals remain established in the AU control 130 during an entire minor cycle of time from $t_6$ of the third cycle.

During $t_4$ of the third minor cycle, signals FT403 and FT411 are once again applied to the gates 134 and 153 at the inputs-1 and 2 respectively of B-adder 139. This again establishes the A digit contents of Section 107A of IR-2 in B-adder 139 along with zeroes at $t_5$. For subsequently addressing that one of the addressable registers 121 wherein the result is to be placed, storage of these A digits is in selector storage 113 at $t_7$, coming from the B-adder output via gate 112 with the application at $t_6$ of a function table signal FT421 thereto. From FIGURE 5 it will be seen that selector storage 113 receives the A digits at $t_7$ of the third minor cycle.

At $t_0$ of the fourth minor cycle both of the operand words are passed into the arithmetic unit 131. From memory 152 the selected operand word is taken by way of the high speed bus and passed through gate 146 into M input register 150. Function table signal FT370 is developed at time $t_7$ of the third minor cycle. At the same time function table signal FT380 is developed which simultaneously permits gate 128 to pass the other operand word from the selected addressable register through pulse formers 129 into the arithmetic unit 131.

One minor cycle is required for execution of the basic add instruction. Also one minor cycle is required for execution of the transfer instructions with which the present invention is immediately concerned. During time $t_7$ of the fourth minor cycle the result of the computation will become available in the arithmetic unit. The result from the arithmetic unit is thereafter transmitted by way of gate 126 and buffer 123 into the recirculation path of addressable registers 121. Gate 126 receives a function table signal FT426 at $t_1$ of the fifth minor cycle. However, during $t_6$ of the fourth minor cycle the function table signal FT434 has been applied to gate 114 and this enables the contents of selector storage 113 to be set up in register selector register 118 at $t_7$ and to be held there as in previous instances for two pulse times. Again a register is selected by register selector decoder 120, in the present case the same register, so that at time $t_2$ of the fifth minor cycle the result of the computation is set up in the seleced one of the addressable registers.

While the result is being obtained from the arithmetic unit 131 and stored in a selected addressable register further function signals are developed to enable the selection and execution of the ensuing instructions. Thus, at $t_0$ of the fifth minor cycle function table signals FT401 and FTUA are applied respectively to inputs-1 and 2 and the carry input of B-adder 139. These enable the gate 137 to pass the contents of control counter 104 to the B-adder 139 where they are increased by one. At $t_2$ of the fifth minor cycle when the results of the addition in the B-adder 139 are available function table signal FT363 is again applied to gate 140 whereby the next succeeding instruction in the regular sequence is called for by way of address decoder 141. Subsequently thereafter the same sequence of events takes place as in the foregoing. Thus, at time $t_2$ of the sixth minor cycle the $(N+1)$th instruction is available on the high speed bus and is gated into IR–1 by the application of a function table signal FT320 to gate 100.

In connection with IR–1, IR–2 and the two control counters 104 and 106, respectively, it will be observed that clear signals are furnished therefor. Such clear signals may in fact be furnished by the same function signals which enable the passage of new information into the respective elements. The structure of these storage devices enabling such clearing operation to be performed will be discussed hereinafter in particular in connection with FIGURE 4.

Basic instructions such as the add instruction just described may be successively extracted from the memory and executed in accordance with the sequence of events as set forth hereinabove and in particular with reference to the timing diagram of FIGURE 5. The addressable registers may be filled by a simple fetch instruction which is similar to the add instruction in operation and sequencing except that no arithmetic operation is performed on the fetched operand.

*Derivation of function table and other control signals*

Figure 2:
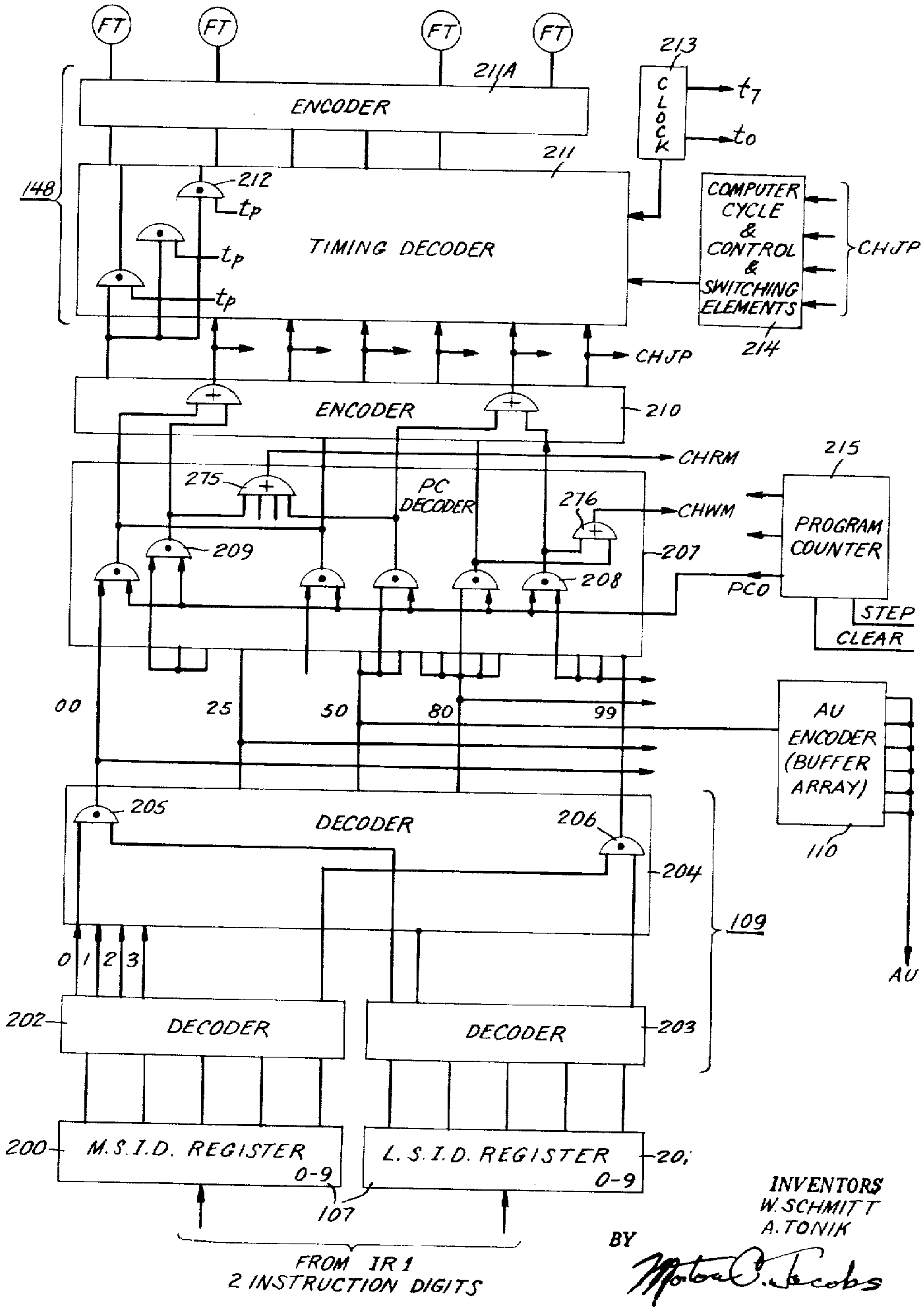
Figure 3A:
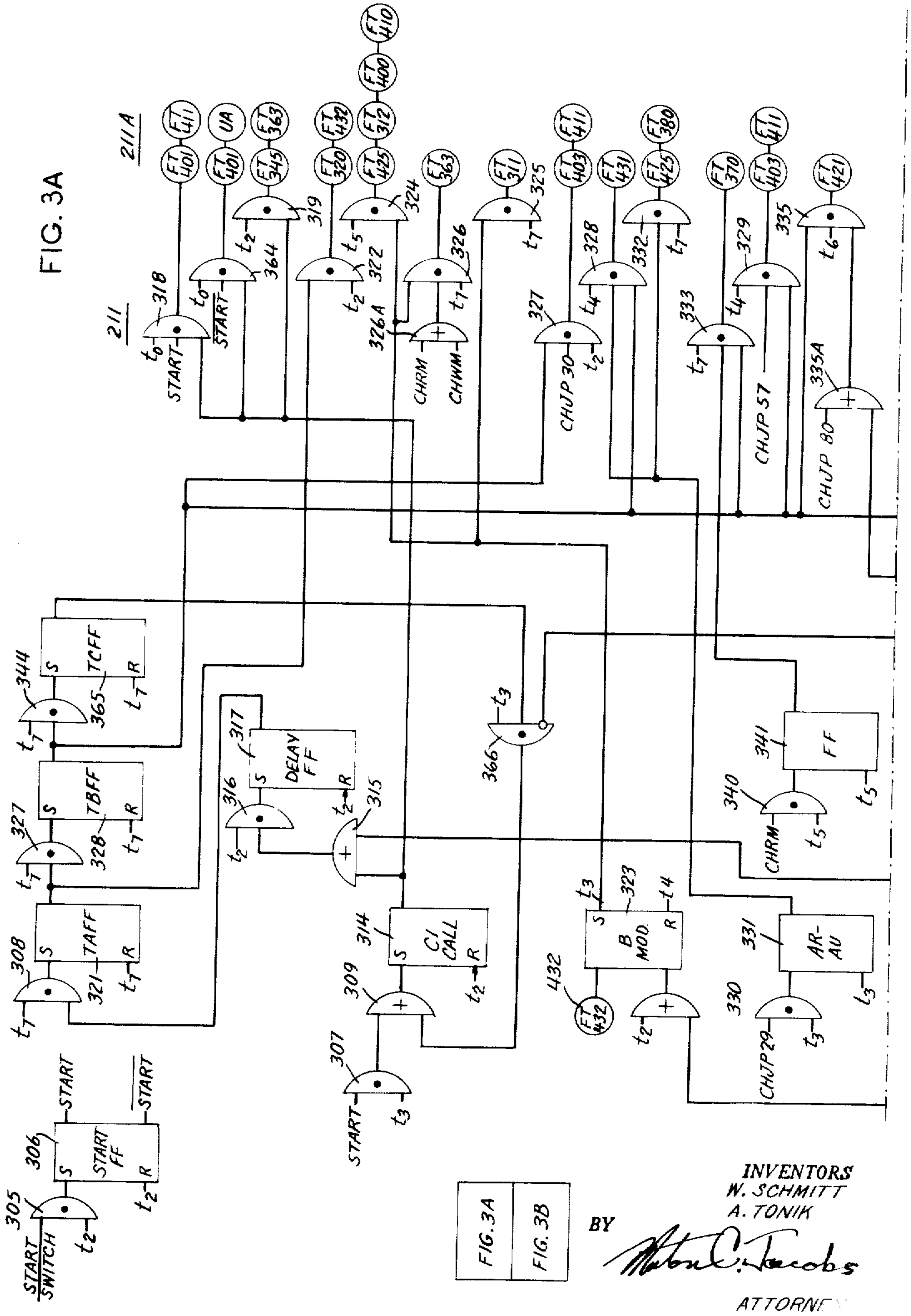

To describe the derivation of function table and other control signals, reference is made to FIGURES 2 and 3. FIGURE 2 provides further details of the control circuits 148 found on FIGURE 1A and the equipment related thereto.

From the discussion of FIGURE 1A it will be recalled that section 107 of IR–2 which stores the I digits of an instruction has its output connected to the instruction decoder 109. On FIGURE 2, section 107 of IR–2 is shown as comprising two sections, viz. a most-significant-instruction-digit register 200 and a least-significant-instruction-digit register 201. Each of registers 200 and 201 comprises five bistable storage elements (such as the well known flip-flop) each having two outputs. The five bistable elements in each of registers 200 and 201 are effective to store five binary digits which form one of the two decimal I digits.

Instruction decoder 109 in FIGURE 1A is shown on FIGURE 2 as comprising two stages and the first such stage comprises decoders 202 and 203 and these correspond respectively to registers 200 and 201 the outputs of which are connected to their respective decoders. The decoders 202 and 203 each comprise a plurality of gates. Upon receiving an input from their respective registers 200 and 201 a single one of ten output lines corresponding to the decimal values 0 through 9 will receive an output signal thereon indicative of the decimal value stored in their corresponding registers.

The ten output lines from decoder 202 and the ten output lines from decoder 203 are connected into the second stage of instruction decoder 109 and this on FIGURE 2 is indicated by reference numeral 204. As in the case of the individual bit decoders 202 and 203, decoder 204 comprises a plurality of coincidence gates, for example, gates 205 and 206. Each output line from decoder 202 and decoder 203 drives ten such gates to that decoder 204 comprises one hundred gates and has coming therefrom one hundred output lines indicated on FIGURE 2 as lines 00–99. Thus, line 00 is the output line of gate 205 in decoder 204. The inputs to this gate 205 are derived from the lines representing decimal digit 0 from decoders 202 and 203. Line 99 is the output of gate 206 receiving the decimal digit 9 lines. The output lines 01 to 98, while not specifically shown, are similarly derived from separate gates. Thus, output line 25 would be the output line of a gate (not shown) in decoder 204 the inputs of which will be taken from the lines representing decimal two output from decoder 202 and decimal five output from decoder 203, respectively.

The one hundred output lines on stage 204 of the decoder 109 are connected to the arithmetic unit encoder 110 also shown in FIGURE 1A. The encoder array 110 comprises a plurality of "or" gates so that, in response to an input from one of the one hundred output lines of decoder section 204, a plurality of output lines from encoder 110 will receive signals thereon. The outputs from instruction encoder 110 are connected to the AU control 130 as shown in FIGURE 1A by way of gates 132.

The output lines 00–99 from section 204 of the decoder also drive the program counter decoder 207 which is a gating matrix. As shown on the drawing each of the lines 00–99 may be applied to the input of several different gates 208, 209 in program counter decoder 207. Thus, the 00 line is shown as being applied to two gates. Each gate in decoding matrix 207 also receives a PC signal derived from program counter 215.

The program counter 215 is not required for any of the instructions with which the present invention is concerned. The program counter is of use where instructions must be carried out which require more than a single minor cycle for the execution portion of their operation. During the execution time of such instructions it is necessary to inhibit production of certain signals which would normally occur in stepping the computer from one minor cycle to the next while such an instruction is in the process of execution. Also certain other signals must be generated during the execution of such an instruction. For this purpose a program counter is provided, but since for sequencing and controlling the transfer instructions in the instant invention, the program counter is never required actually to count beyond zero, it will remain fixed in its output at that zero count. It is assumed for the purposes of FIGURE 2 that counter 215 remains in the zero count during the operation described. The counting arrangement 215 may be as described in "Basics of Digital Computers," S. S. Murphy, vol. 3, page 91, or "Arithmetic Operations in Digital Computers," by Richards, page 338.

Certain lines within program counter decoder 207 are buffed together in buffer 275 to generate a signal used to control certain further elements in the machine. Other lines within program counter decoder 207 are buffed together in buffer 276 to generate a further signal also used to control other elements in the machine. The use of these signals will become more apparent following a discussion of FIGURE 3. One of these signals is the CHRM signal and is generated by all instructions requiring the reading of operands from the memory. The other signal is the CHWM signal and is generated by instructions requiring the writing in of information to the memory.

The memory, for purposes of this description may be considered as having a cycle divided into a read half-cycle of eight pulse times followed by a write half-cycle of eight pulse times. For writing into the memory, the address signals along with CHWM are supplied to the memory first drive the addressed memory location to clear out its contents. The input information supplied on HSB–W is set up in input registers (not shown) of the memory, and, upon completion of the read half-cycle, that input information is written into the addressed memory location. When the memory is cleared during the read half-cycle of that write operation, the information at the addressed location does not appear on the HSB–R because a gate (not shown) between the memory output and HSB–R, which gate is closed during a write operation. For reading data from the memory, the read signal (CHRM) is supplied which is set up in a flip-flop (not shown) in the memory, and the output of this read-signal flip-flop is used to enable the gate to pass the memory output signals to HSB–R. If the information read out of the memory location is also recirculated, to be read back into the memory location, this same read-signal flip-flop can be used to control this recirculation on the read operation.

Instructions are read from the memory only at a time $t_x$. In this case the address signal from address decoder 141 together with a $t_x$ pulse applied to the memory are sufficient to read an instruction.

The output lines from encoder 210 are each labeled CHJP. Each of the output lines from decoder 207 when applied to encoder 210 causes encoder 210 to produce a plurality of the CHJP signals. Thus, a plurality of CHJP signals are generated for each instruction. Some of these (which are numbered) perform the same function but are generated on different instructions. The CHJP signals are required for a variety of purposes within the machine. In particular, CHJP signals are connected into the computer cycle control and switching elements 214 wherein they control a large number of further control elements. Further details of block 214 in FIGURE 2 are shown in FIGURE 3 and will be discussed with reference to the latter.

The CHJP signal lines are also connected into timing decoder 211 which comprises another gating matrix having therein a plurality of coincidence gates as, for instance, gate 212. Some of these gates may receive permissive signals from any one of a number of CHJP lines. Thus, if reference is made to FIGURE 3*a* it will be noted that CHJP signals 38 and 40 and 41 all operate as permissors for gate 334. Other CHJP signals with which the present invention is concerned and which are generated by various instructions appear on FIGURE 3 as CHJP 09, 20, 22, 23, 29, 53, 26, 30, 32, 54, 56 and 57. Gates 212 and the like each receive a further input in the form of serial timing signals ($t_0$–$t_7$). Such timing signals are derived from clock 213 which has eight output lines from $t_0$ through $t_7$. Pulses are produced by clock 213 on each of its output lines in seriatim during each minor cycle. Clock circuits are entirely conventional in nature. For further details concerning these, reference is made to Proceedings of the I.R.E., January 1952, page 22. The gates in decoder 211 are also controlled by the output of block 214.

The output lines from decoder 211 are connected to the final encoder stage 211A which is a further matrix comprised of "or" gates. Since an encoder may produce signals on a plurality of output lines upon receipt of a single input signal it will be understood that each output line from decoder 211 is thereby effective to excite one or more different output lines of encoder 211A. The outputs of encoder 211A are function table signals (FT) used to operate the various gates of FIGURE 1A set forth in the description of a typical instruction as it progressed through FIGURE 1A. The arrangement of decoder 211, encoder 211A, control 214 and clock 213 are described in connection with FIGURE 3.

Refer now to FIGURE 3. FIGURE 3 is a detailed diagram showing the various elements and interconnections thereamong wherefrom is obtained each of the various function table signals required for the operation of the computer shown in FIGURE 1A.

FIGURE 3 appears on two separate sheets labelled respectively 3A and 3B and these should be assembled as shown in the smaller block appearing on sheet 3A to understand fully this section of the computer. Referring, therefore, to sheet 3A of FIGURE 3, flip-flop 306 will be observed having a set input that is connected to the output of the gate 305. By means of a starting switch (not shown) of a single pulse type, a signal is applied to the start flip-flop 306 at time $t_2$. An input to the reset terminal from start flip-flop 306 occurs at time $t_2$ also. Because of the construction of this and other flip-flops found throughout the machine when a set and reset signal are simultaneously applied to a flip-flop the set signal always takes precedence whereby the flip-flop will be placed in its set condition. Explanation of these flip-flops and their method of operation is reserved for discussion in connection with FIGURE 4.

Due to the inherent delays in all flip-flops found throughout the machine, output signals will be available one pulse time following input signals thereto. This will appear from the various timing diagrams wherein the various signals are shown at the times in which they are actually set up in their respective registers and not at the times when timing signals are applied to the controlling gates. Thus, at time $t_3$ start flip-flop 306 will produce a start signal from its set output terminal. Such signal will be retained for one minor cycle until the next $t_2$ timing signal is applied to the reset input of the start flip-flop 306, whereupon start flip-flop 306 will produce a $\overline{\text{start}}$ signal from its reset output terminal.

The start signal is passed by gate 307 at time $t_3$ and the output of gate 307 is applied to one input of buffer 309. The output of buffer 309 is connected to the set input of C1 Call flip-flop 314. At time $t_4$ flip-flop 314 produces an output signal from its set output terminal and this output terminal is connected to the inputs of three gates and one buffer, respectively, gates 318, 319, 364 and buffer 315. It is to be noted that C1 Call flip-flop 314 remains in its set output condition until the end of time $t_2$ of the following minor cycle, a reset signal being applied at $t_2$. At time $t_0$, of that following minor cycle, gate 318 is enabled to pass a $t_0$ timing signal because it is enabled by signals from C1 Call flip-flop 314 and a start signal from the start flip-flop 306. It will be seen that the output of gate 318 produces function table signals FT401 and FT411 by means of an encoding matrix (not shown in detail).

Figure 5:
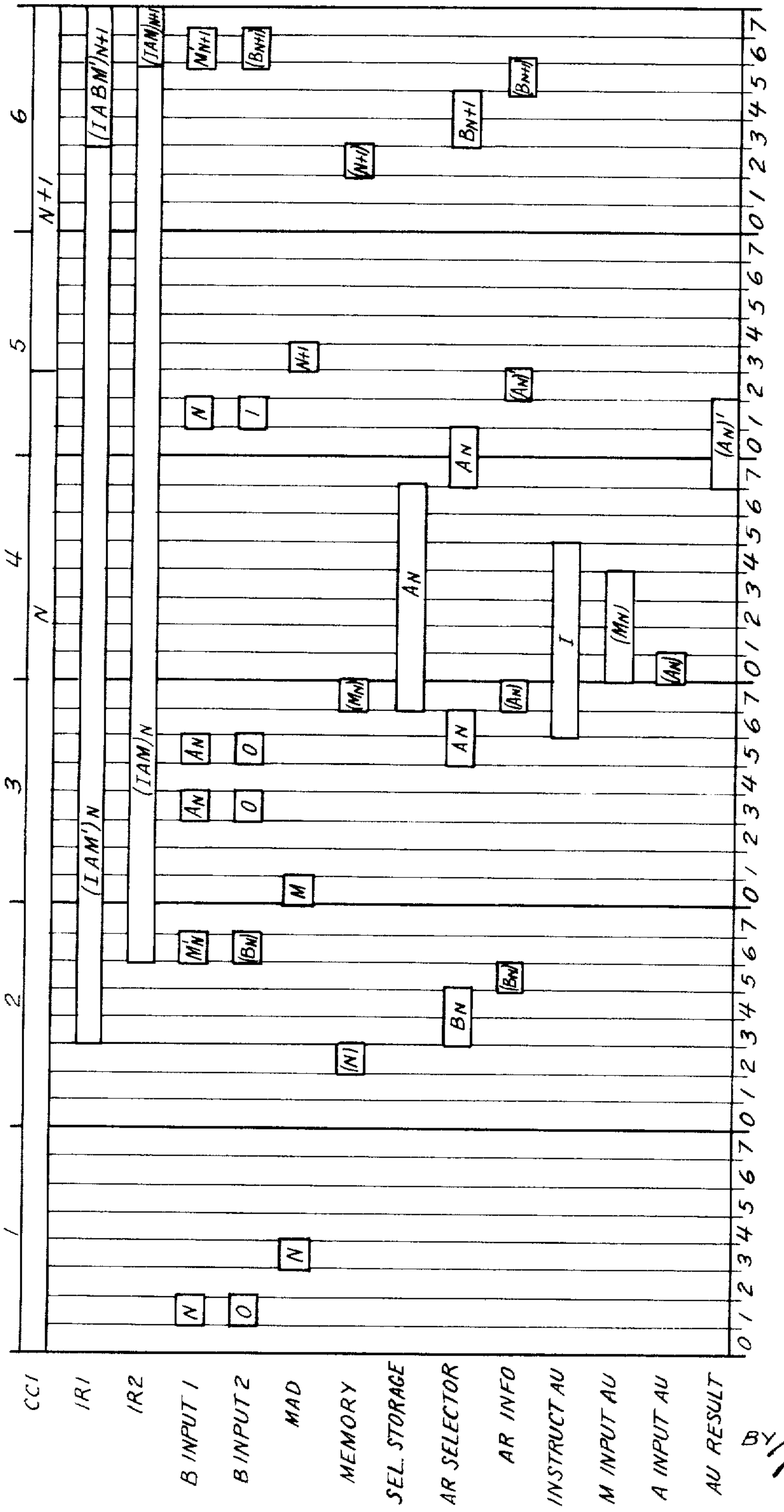
FIGURE 5 is a general timing diagram indicating the progressive sequence of events occurring in the apparatus of FIGURE 1*a* during an add instruction.

It may be seen by reference to FIGURES 1A and 5 that function table signals FT401 and FT411 gate (at $t_0$) the contents of control counter 104 along with coded zeros into inputs 1 and 2 respectively of the B-adder 139, where they are established at $t_1$. This minor cycle initiating the call for an instruction represents the beginning of the instruction sequence and will be referred to hereinafter as the first minor cycle.

At time $t_0$ during the starting cycle of the machine, gate 364 is not activated because in order to activate gate 364, the $\overline{\text{start}}$ signal is required from start flip-flop 306. It will be realized that on ensuing cycles of operation within the machine the start flip-flop 306 will be maintained in its reset condition whereby the $\overline{\text{start}}$ signal will be obtained therefrom. Thus, on succeeding calls from the C1 Call flip-flop 314 the normal progression of signals at time $t_0$ will be through gate 364 and it will be seen that gate 364 derives function signals FT401 and FTUA. Thus, on calls after the first call, one is added to the contents of the control counter on each passage through the B-adder 139.

At time $t_2$ of the first minor cycle, gate 316 receives a timing signal. Gate 316 is connected to the output of buffer 315 and the output of gate 316 in turn is effective to place a set signal on flip-flop 317. Also at time $t_2$, gate 319 passes a pulse to generate FT345 and FT363. Function table signal FT363 is effective as will be realized from FIGURE 1 to enable gate 140 to pass the output of the B-adder to memory address decoder 141. The function table signal FT345 enables the output of the B-adder to be read back into control counter 104 via gate 143.

At time $t_3$ flip-flop 317 will produce an output from its set output terminal and at $t_7$ of the first minor cycle such output will be gated through gate 308 thereby to set TA flip-flop 321 which, in turn, produces its set output signal at $t_0$ of the second minor cycle. At $t_2$ of the second minor cycle the output of TA flip-flop 321 enables gate 322 to derive two further function table signals. Also a reset signal is applied to flip-flop 317. It will be observed that these signals are respectively FT320 and FT432. Referring again to FIGURE 1A, in connection with FIGURE 5, it will be observed that the 320 function table signal enables the contents of the selected memory location, as previously determined by the control counter 104, to be read into instruction register 101. At the same time the function table signal FT432 in conjunction with FT320 enables the B digits of the instruction word from the memory to be passed through gates 117 into register selector register 118. Referring again to FIGURE 3A it will be seen that function table signal FT432 places a set signal on B-Mod flip-flop 323. Accordingly, at time $t_3$ of the second minor cycle, B-Mod flip-flop 323 will produce an output therefrom. This output is applied to the inputs of three gates 324, 325 and 326. During time $t_5$ of the second minor cycle, gate 324 produces four function table signals and these are respectively FT400, FT410, FT312 and FT425.

Referring again to FIGURE 1A in conjunction with FIGURE 5, it will be seen that function table signal FT400 enables gate 136 to pass the M′ digits from IR–1 (101) into input 1 of the B-adder and FT410 enables gate 133 to pass a portion of the contents of a selected addressable register 121 into input 2 of the B-adder. Function table signal FT312 enables gates 102 and 103 to pass the I digits and the A digits of the instruction from IR–1 into sections 107 and 107A of IR–2 whereby the I digits are now available for decoding. Function table signal FT425 places a permissive signal on gates 122 thereby to enable regeneration of the addressable register as previously selected.

Referring back to FIGURE 3*a* at time $t_7$ gate 325 will be enabled to pass a signal and gate 326 will be enabled to pass a signal provided that a CHRM signal or a CHWM signal has been obtained from the program counter decoder 207 of FIGURE 2 via buffer 326A. These latter signals will be derived for any instructions requiring use of the memory. Assuming that the present is such an instruction, it will be observed that at $t_7$, gates 325 and 326 derive function table signals FT311 and FT363. Function table signal FT363, as in the previous case, permits the gate 140 to pass the output of the B-adder 139 to the memory 152 via address decoder 141. On this occasion the purpose is, of course, to select an operand word from the memory. Function table signal FT311 allows gates 105 to pass the output of the B-adder into section 108 of IR–2 whereby this section of IR–2 now stores the modified M digits of the instruction.

At time $t_7$ of the second minor cycle a reset signal is applied to TA flip-flop 321 and at the same time gate 327 is enabled to pass a set signal to TB flip-flop 328. With TB flip-flop 328 producing a set output signal at time $t_0$ the third minor cycle of operation is now entered. During this third minor cycle the various CHJP signals produced by the output of encoder 210 of FIGURE 2 are effective. As previously indicated during the discussion of FIGURE 2 such signals are used for a variety of purposes in deriving the ultimate function table signals.

Gate 327 receives a permissive signal from the output of TB flip-flop 328 and a CHJP 30 signal. At $t_2$ of the third minor cycle, gate 327 derives two function table signals, namely FT403 and FT411. Function table signal FT403 enables gate 134 in FIGURE 1 to pass the contents of section 107A of IR–2 into input 1 of the B-adder 139. Function table signal FT411 as in previous cases passes zeroes into input-2 of B-adder 139. From the timing diagram of FIGURE 5 it is apparent that these inputs actually are established in the B-adder by time $t_3$ of the third minor cycle.

At $t_3$ a CHJP signal is passed by way of gate 330 to the set input terminal of the AR to AU flip-flop 331 so that at $t_4$ flip-flop 331 is producing a set output signal. Such signal is applied to gates 332 and 328. The $t_4$ pulse is passed by gate 328 to derive FT431. It will be observed from FIGURE 1 that this FT431 signal enables gates 116 to pass the output of the B-adder into register selector register 118 so that an addressable register operand word may be selected. Also occurring at $t_4$ of this minor cycle is the setting of the AU-to-AR flip-flop 337 by way of a CHJP 53 signal and a $t_4$ pulse applied through gate 336.

It will be observed that a CHJP 41 signal in conjunction with the set output condition of TB flip-flop 328 will enable gate 334 to pass the $t_5$ pulse. Thus, gate 334 is enabled to pass a signal to derive the 300 function table signal. This latter signal, as previously discussed, is effective to pass the encoded I digits of the instruction from AU encoder 110 into the AU control circuits 130 via gates 132. The timing pulse $t_4$ of the third minor cycle is also applied to gate 329 with a CHJP 57 signal. Gate 329 is effective to produce function table signals FT403 and FT411 whereby the A digits held in section 107A of IR–2 are again passed through the B-adder 139 and zeroes are added thereto.

The timing pulse $t_5$, together with the CHRM signal, is applied by way of gate 340 to set flip-flop 341, the output of which will be available at $t_6$. At $t_6$ gate 335 is effective to supply a pulse generating function table signal FT421, and this signal, as may be determined from FIGURE 1A, permits the output of B-adder 139 to be passed into selector storage 113 by way of gate 112. At $t_7$ since TB flip-flop still produces its output signal and since flip-flops 331 and 341 are set, gates 332 and 333 are enabled to pass $t_7$ and to generate function table signals FT370, FT380 and FT425. Function table signal FT370 enables gates 146 to pass the contents of the selected memory location storing the desired operand word from the high speed bus into the M input register 150 to be established there at $t_0$ of the fourth minor cycle. Function table signal FT380 similarly permits a selected operand word from the addressable registers 121 to be read into the arithmetic unit via gates 128 and pulse formers 129. As in previous instances function table signal FT425 enables regeneration of the addressable regitser by way of gates 122, buffers 123 and pulse formers 151.

At time $t_7$ of the third minor cycle TB flip-flop 328 receives a reset signal and TC flip-flop 365 receives a set signal by way of gate 344. During this fourth minor cycle the instruction is executed in the arithmetic unit and since all instructions with which the present application are concerned require but one minor cycle for execution most of the activity during this time will be found within that unit.

However, during this fourth minor cycle a permissive signal is applied to gate 366 from the TC flip-flop 365 which allows gate 366 to pass a $t_3$ timing signal. The output of gate 366 enables setting of C1 Call flip-flop 314 via buffer 309 whereby the next instruction in the sequence is called for. Also during the fourth minor cycle at $t_3$ the result flip-flop 339 is set by way of gate 338 since the set output signal is still obtained from AU-to-AR flip-flop 337. At $t_6$ accordingly gate 342 connected to the set output of the result flip-flop 339 supplies a pulse to generate signal FT434. Reference again to FIGURE 1 will show that FT434 permits gates 114 to pass the contents of selector storage 113 to register selector register 118 whereby an addressable register is thereupon selected for storage of the result shortly to become available in the arithmetic unit. Since result flip-flop 339 is not set until $t_4$ of the fourth minor cycle gate 343 connected to the set output thereof and to the $t_1$ output of the clock 213 will not be enabled to pass signals until time $t_1$ of the ensuing fifth minor cycle. At $t_1$ in the fifth cycle, gate 343 is enabled to generate FT426. From FIGURE 1 it will be observed that this latter signal permits gate 126 to read the results obtained from the arithmetic unit 131 via gates 126, buffers 123 and pulse formers 151 back into the addressable registers 121 and into the register which was selected by means of register selector register 118 and register selector decoder 120. Subsequent operations will follow the same pattern for standard instruction, except of course that following the starting operation the $\overline{\text{start}}$ signal will appear on start flip-flop 306 whereby the output signal from C1 Call flip-flop 314 will pass via gate 364 rather than via gate 318, whereby the contents of control counter 104 will be increased by one upon each passage through B-adder 139.

The remaining components shown in FIGURE 3 concern the derivation of signals for various transfer of control and detection operations which are required by the instructions to be described hereinafter. Detailed consideration of FIGURE 3 in connection with these latter signals will follow discussion of each of these particular instructions themselves.

Consider now an instruction effective to set one of the addressable flip-flops 162. Such an instruction initially is handled in precisely the same manner as the basic add instruction discussed hereinabove. The instruction is the 97 instruction and will appear as follows:

097 AA 00 00000

Herein the digits 97 upon arriving in the control circuits are effective to generate the necessary function signals for setting a desired addressable flip-flop while the AA digits are effective to select that flip-flop which it is desired to set.

Figure 8:
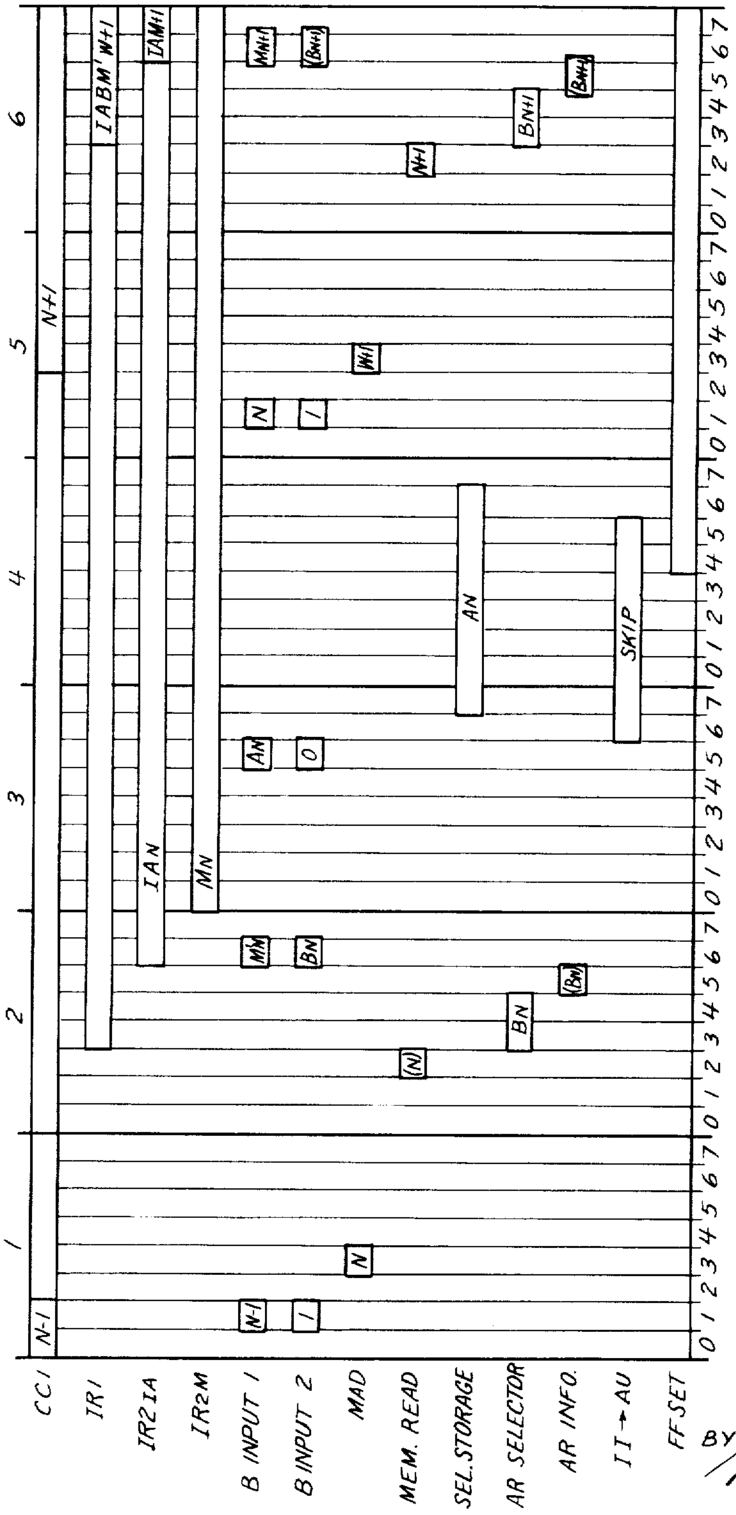
FIGURE 8 is a timing diagram showing the sequence of events occurring when an addressable flip-flop is set by an instruction.

Thus, referring to FIGURE 1*a*, read in conjunction with FIGURE 8, it will be seen that if a previous instruction is designated as N–1 then, following the addressing of the memory from the first control counter 104 via the B-adder 139 and address decoder 141, the Nth instruction (considered to be the 97 instruction) will subsequently be extracted from the memory and established in IR–1 at $t_3$ of the second minor cycle. At this time the normal B modification select is performed via gates 117. However, inasmuch as the B digits themselves have been indicated as zeros and as the M digits are not used, such operation is not significant except wtih regard to preserving the normal timing and sequence of events whereby the I and A digits of the instruction are gated via gates 102 and 103 (FIGURE 1A) into sections 107 and 107A, respectively, of IR–2 to be therein established at $t_6$ of the second minor cycle. During the third minor cycle function table signals FT403 and FT411 are generated at $t_4$ thereby to enable gates 134 to pass the A digits from section 107A of IR–2 into input 1 of the B-adder and to enable gates 153 to pass zeros from register 147 into input 2 of the B-adder. The output from the B-adder is subsequently gated by a 421 function table signal into selector storage 113 to be set up therein at $t_7$ of the third minor cycle.

At $t_5$ of the third minor cycle the FT300 signal is applied to gates 132 thereby to enable the encoded 97 digits from instruction encoder 110 to pass into AU control 130. The 97 digits when encoded and passed into AU control 130 are effective to provide a skip which ensures that no results will be produced or forthcoming from the arithmetic unit.

From selector storage 113 the A digits are decoded by decoder 163. This decoder may be similar in nature to the decoder found in FIGURE 2 for decoding the I digits into a plurality of lines corresponding to the decimal numbers 0 through 9. The output of the decoder 163 appears in more detailed form on FIGURE 3*b* wherein the first and most significant A digit is decoded into one of lines CHSR 1–9. The other A digit is decoded into lines CHST 1–9. The combination of two of these lines is applied along with signals from the control circuits 148 and timing signals at $t_3$ to gate 370 or a corresponding gate associated with one of the other addressable flip-flops so that an output obtained through coincidence of input signals is effective to set the associated flip-flop.

Figure 3B:
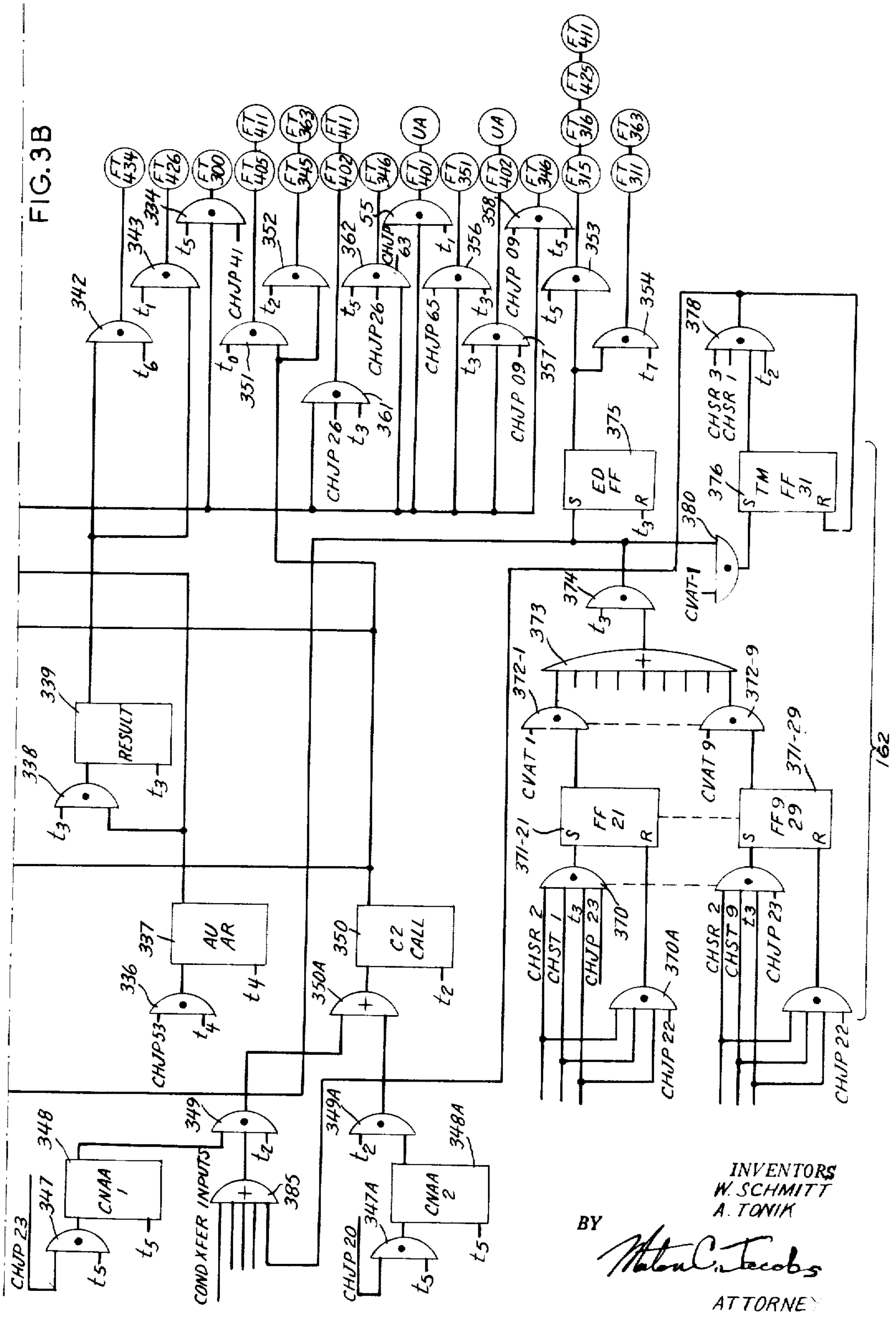

In FIGURE 3*b* details of the addressable flip-flops are shown wherein only two of such flip-flops are specifically indicated, it being readily apparent, however, that any number within the limit of the addressing scheme may be provided. On FIGURE 3 addressable flip-flop 21 is identified as 371–21. Similarly, addressable flip-flop 29 may be set by coincident appearance on its input gate of a CHSR–2, CHST–9 and CHJP–23 and the $t_3$ signal. Thus, it is apparent that the designated one of the addressable flip-flops will produce a set output by the time $t_4$ of the fourth minor cycle and this is indicated on FIGURE 8. The same process is used to reset any of the addressable flip-flops. In this case, however, the instruction is a 96 instruction and the CHJP signal derived is CHJP–22. Inasmuch as the details, except for those noted, are precisely the same, the 96 instruction resetting the designated addressable flip-flop has not been separately illustrated.

Consider next the unconditional transfer instructions with which the application is concerned as will appear hereinafter. These are respectively the 90 and 91 instructions. The 91 instruction as will appear subsequently is also the instruction which is generated upon coincidence of a T digit in IR–1 with the set condition of one of the addressable flip-flops 21–29. However, since there are certain differences between the 91 instruction as programmed and as generated, in the interests of clarity, the 91 instruction will be considered independently. However, first consider the 90 instruction.

Figure 6:
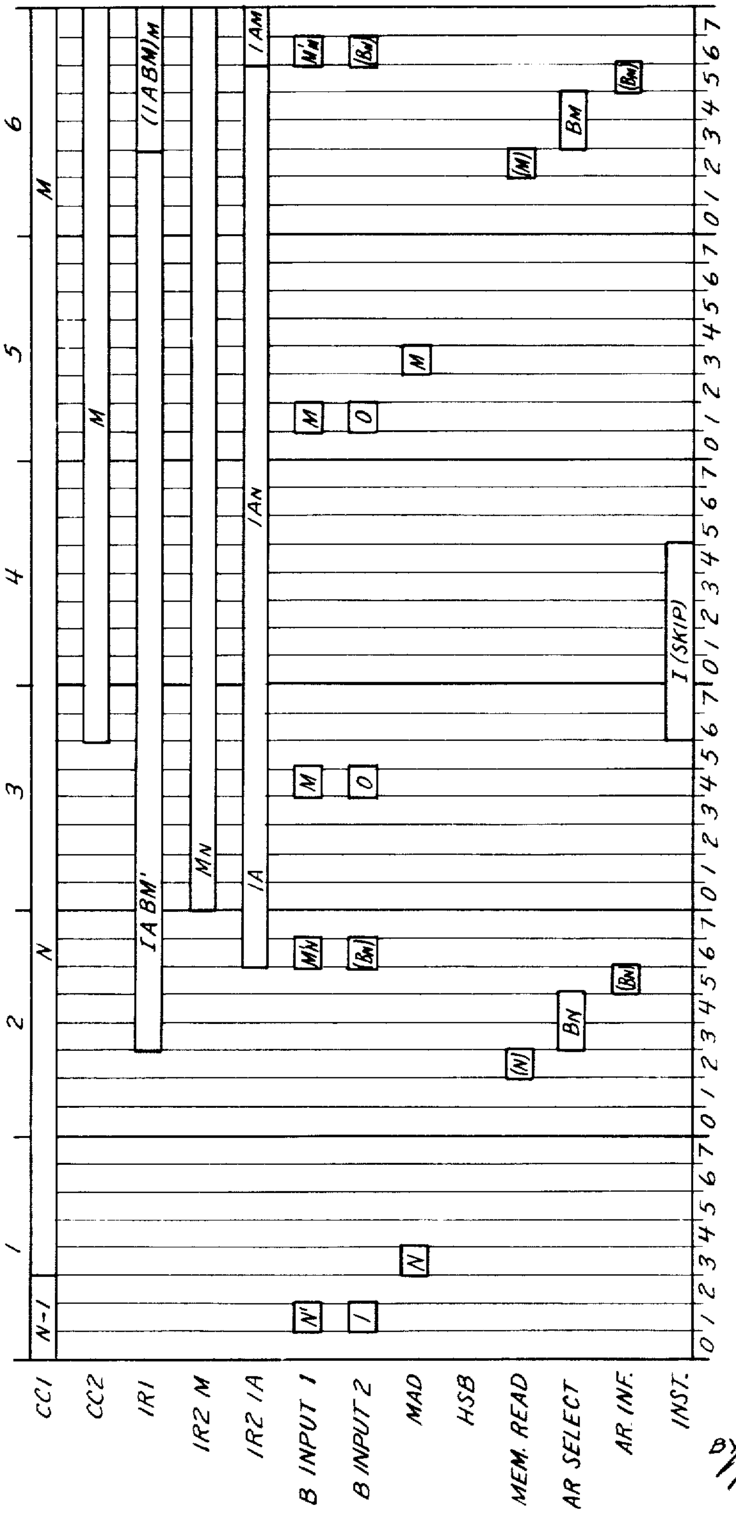
FIGURE 6 is a timing diagram showing the sequence of events when a first type of unconditional transfer instruction is executed.

The 90 instruction is an unconditional jump or transfer of control requiring that the M address of such 90 instruction be placed in the first control counter 104 and that the routine proceeds from that designated memory address. Refer, therefore, to FIGURE 6 in conjunction with FIGURES 1*a* and 3. As in the case of the add instruction shown in FIGURE 5 the previous contents N–1 of the control counter 104 are gated through the B-adder augmented therein by one and sent out on the address lines via the address decoder 141 to extract the Nth instruction. In this instance the Nth instruction is assumed to be a 90 instruction. At $t_3$ of the second minor cycle the instruction will be set up in IR–1 and at $t_6$ the M′ digits thereof are set up in the B-adder input 1 thereby to be modified by the contents of a designated addressable register. At $t_6$ also the I and A digits are gated into IR–2 from whence the I digits may be subsequently decoded and sent to the control circuits. Since the A digits are not used in the present instruction they may be zeros.

During the third minor cycle the 90 instruction digits and the I portion in 107 of IR–2 are decoded as previously explained in conjunction with FIGURE 2 to produce a CHJP 26 signal. By reference to FIGURE 3 it will be seen that the CHJP 26 signal renders gate 361 permissive to pass a $t_3$ timing pulse and this in turn supplies signals FT402 and FT411. Again referring to FIGURE 1A it will be seen that these signals enable the M digits of IR–2 along with zeros to be set up in B-adder 139 at $t_4$. At $t_5$ CHJP 26 permits gate 362 to pass a signal generating FT346. In FIGURE 1*a* it is seen that FT346 when applied to gate 144 is effective to place the output of the B-adder 139 into the second control counter 106. Thus, the M digits will be set up in the second control counter at $t_6$ of the third minor cycle.

Also produced by the 90 digits appearing in section 107 of IR–2 will be CHJP 41. This is applied to gate 334 on FIGURE 3 and is effective to pass a $t_5$ timing pulse thereby deriving FT300. As previously noted FT300 is applied to gate 132 in FIGURE 1*a* and is effective to pass the encoded instruction digits into Arithmetic Unit control 130. In the present instance such control digits constitute a skip order as applied to the arithmetic unit; accordingly, no significant operations are performed within that unit for this instruction.

One further CHJP signal produced by the 90 digits of the instruction is CHJP 20. This is applied to CNAA flip-flop–2 (348A) at $t_5$ of the third minor cycle whereby the CNAA-2 flip-flop will be set at $t_6$. At $t_2$ of the fourth minor cycle gate 349A is enabled to pass a pulse which, in turn, is applied to the C–2 Call flip-flop 350 via buffer 350A. Accordingly, at $t_3$ of the fourth minor cycle C–2 Call flip-flop 350 will be set. The setting of C2 Call flip-flop is effective to apply signals to gates 351 and 352 and is also effective to apply an inhibitory signal to gate 366 and a permissive signal to gate 316 via buffer 315.

It will be recalled from the consideration of the timing diagram of FIGURE 5 that at the end of the third minor cycle (i.e., at $t_7$ thereof) a reset pulse is applied to TB flip-flop 328 and a set input at the same time is applied to TC flip-flop 365 via gate 344. Accordingly, at $t_0$ of the fourth minor cycle TC flip-flop 365 produces an output which is normally effective at $t_3$ of the fourth minor cycle to place a set signal on C1 Call flip-flop 314 via buffer 309. In the present instance because of the inhibitory signal derived from the setting of C–2 Call flip-flop 350, C–1 Call flip-flop 314 is not set at this time. Since C–2 Call flip-flop 350 does not supply an output signal however until $t_3$ of the fourth minor cycle, delay flip-flop 317 which receives $t_2$ signals on its input gate 316 cannot be set until the fifth minor cycle. By means of a $t_7$ pulse at the end of the fourth minor cycle TC flip-flop 365 will be reset. At $t_0$ of the fifth minor cycle the output of C–2 Call flip-flop 350 is applied to gate 351 whereby signals FT405 and FT411 are produced by the output thereof. In FIGURE 1*a* it will be observed that these signals are respectively effective to pass the contents of the second control counter 106 along with zeros into the B-added 139. From FIGURE 6 it is evident that the M digits of the 90 instruction, as previously stored in the second control counter 106, will be set up in the B–adder along with zeros at $t_1$ of the fifth minor cycle. At $t_2$ gate 352 in FIGURE 3 is effective to pass a pulse thereby generating FT345 and FT363. FT363 is effective to gate the output of the B–adder through address decoder 141 via gate 140 where it will be set up on the memory address lines at $t_3$. Signal FT345 at the same time is effective to gate the output of the B–adder via gate 143 into first control counter 104. Accordingly, from a study of the foregoing sequence of events it will be realized that the overall effect of the instruction has been to call for the next instruction to be extracted from the memory location indicated by the M digits of the 90 instruction just executed. Since these M digits have been placed following the call into the first control counter 104 it will be apparent that succeeding calls will be in the sequence determined by the aforesaid M digits of the 90 instruction which just initiated the transfer. From a consideration of the circuits in connection with the timing diagram of FIGURE 6 it will be realized that following the call for the next instruction (M) the sequence of events is precisely that of the basic add instruction previously discussed. Thus at $t_3$ of the fifth minor cycle delay flip-flop 317 will produce its set signal in view of the signal applied to its input gate 316 from the set output condition of the C–2 Call flip-flop. This, of course, initiates the regular cycling of the events in accordance with the set and reset times of the TA flip-flop 321, TB flip-flop 328 and TC flip-flop 365. Hence at $t_0$ of the sixth minor cycle TA flip-flop 321 will be producing its set output, which at $t_2$ of the sixth minor cycle enables the derivation of FT320 and FT432 from gate 322. These, as in the normal course of events, permit the new instruction to be read into IR–1 and the B modification to be performed on the M digits thereof.

Figure 7:
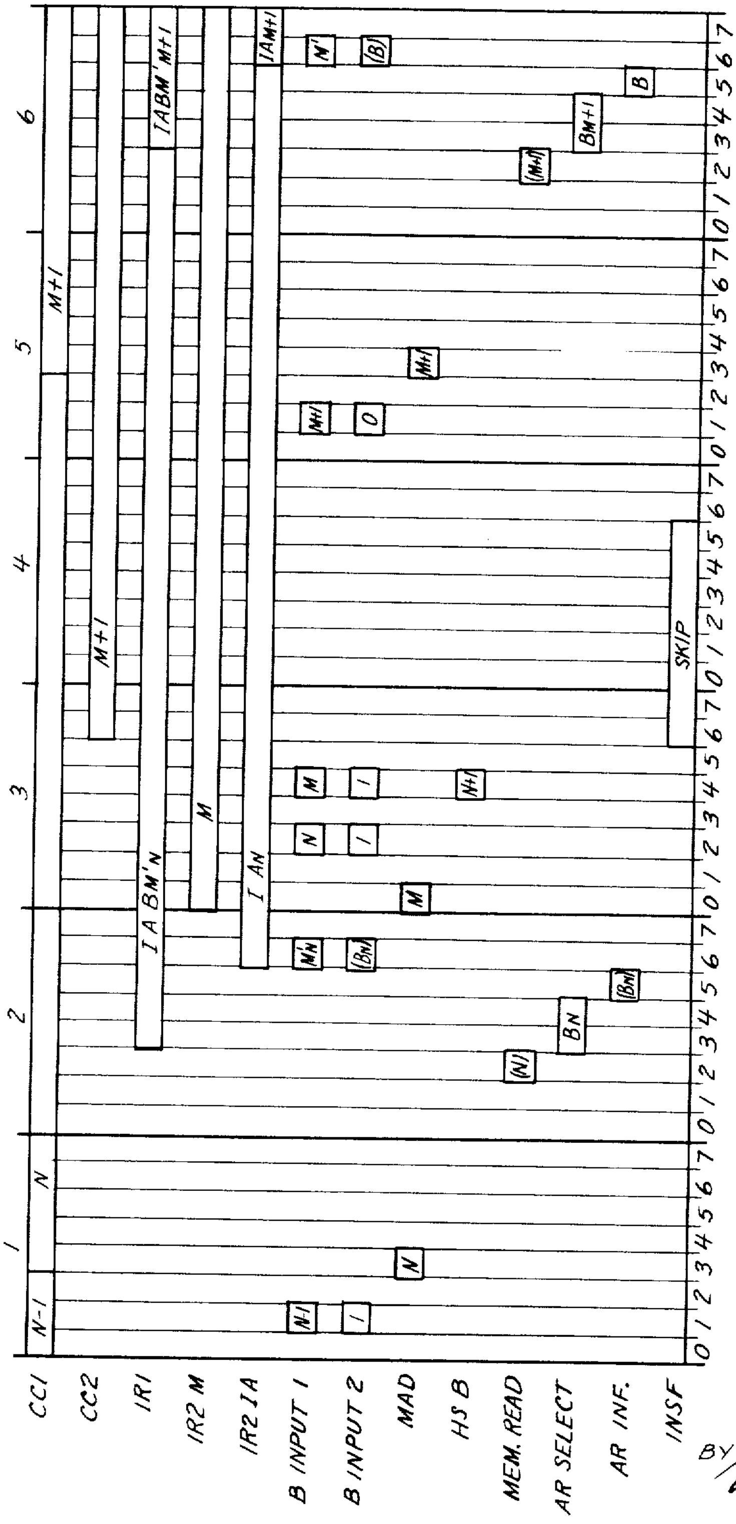
FIGURE 7 is a timing diagram showing the sequence of events when a second type of unconditional transfer instruction is executed.

We now consider the 91 instruction. Since this instruction is the instruction which is generated by the computer upon the detection of a tracing digit when a corresponding addressable flip-flop is set it is desirable to examine the instruction as it might be programmed previous to considering its effect when generated by the computer. Accordingly, reference is made to FIGURE 7 in conjunction with FIGURES 1*a* and 3.

The 91 instruction is, like the 90 instruction, an unconditional jump or transfer. Its effect is to add "1" to the M digits forming a part thereof and to address the memory for the succeeding instructions in accordance with the thus augmented M digits. The augmented address is placed in control counter 104. Thus, $M+1\rightarrow C$. Also the memory address C as indicated by control counter 104 from which the 91 instruction was extracted is increased by one and placed in the memory at the address thereof designated by the M digits. Thus, $C+1\rightarrow M$.

Up until the end of the second minor cycle precisely the same sequence of events occur in the 91 instruction as would in the 90 instruction just described. Thus in the first minor cycle the instruction is called for from the memory. In the second minor cycle a B modification is performed and the memory is again addressed. However, when the I digits (91) of the instruction are set up in IR–2 a different series of CHJP signals are derived from the program counter decoder 207 and encoder 210 of FIGURE 2.

Thus, for the 91 instruction CHJP signals 63, 65 and 09 are derived while CHJP 26 is not derived. As in the case of the 90 instruction, however, CHJP 20 and CHJP 41 will be derived. From FIGURE 3 it will be seen that CHJP 63 renders gate 355 permissive during the third minor cycle so as to pass a $t_1$ timing pulse thereby deriving FT401 and FTUA. FT401 is seen to gate the contents of the first control counter 104 via gate 137 into input 1 of the B-adder while the unit add signal UA gates decimal 00001 into input 2 of the B-adder. Accordingly, the contents of the first control counter 104 indicating the address in the memory N from which the 91 instruction now being executed was derived is increased by one. The FIGURE 7 timing diagram shows the B-adder inputs set up at $t_2$ of the third minor cycle with N and one. At $t_3$ CHJP 65 permits gate 356 to generate FT351. FT351 is applied to gates 165 and 167 on FIGURE 1*a* from which it may be seen that the output of the B-adder is gated into the high speed write bus at the same time the number 0900000 is gated into the high speed write bus from register 166. The output of the B-adder 139 will constitute the five least significant digits of the overall number sent to the memory 152 via the high speed write bus while the number 0900000 will constitute the seven most significant digits thereof. When combined in the High Speed Bus these two numbers form one 12 digit word.

The M digits of the 91 instruction following the B modification step, are gated into the memory address lines, as in the case where an operand is to be selected from the memory. It will be shown that in the present instance the effect will be to write into the memory at the address designated by M, the output of the B-adder $(n+1)$ as placed on the high speed write bus HSB–W just described. In the case where it is desired to read an operand from the memory the CHRM signal is obtained from the Program Counter decoder 207 of FIGURE 2. However, in the present instance wherein information is being written into the memory a CHWM signal is derived. The CHWM signal enables the writing of information into the memory to be performed, by permitting the derivation of FT363 at $t_7$ of the second minor cycle via buffer 326A and gate 326. The situation now existing is that the contents of the control counter 104 as augmented by one have been sent to memory location M along with 90 in the instruction digits (II) position thereof. The reason for placing the 90 instruction along with the address of the next instruction in the regular routine will become more apparent as this description proceeds.

The derivation of the CHJP 09 signal enables gate 357 to pass a $t_3$ timing pulse which is effective to generate FT402 and FTUA. Referring back to FIGURE 1*a* it will be observed that these signals are effective to place the M digits presently stored in section 108 of IR–2 along with decimal 1 (00001) into the B-adder 139 wherein they are set up at $t_4$ of the third minor cycle. At $t_5$ CHJP 09 enables gate 358 to generate FT346. FT346 has the same effect as in the case of the 90 instruction previously described and enables gate 144 (FIGURE 1*a*) to pass the output of the B-adder $(M+1)$ into the second control counter 106. From this point the same sequence of events occurs as would in the 90 instruction. Thus, CHJP 20 enables CNAA flip-flop 2 to be set at $t_5$ of the third minor cycle thereby allowing C–2 Call flip-flop 350 to be set by a pulse applied at $t_2$ of the fourth minor cycle at gate 349A. Also CHJP signal 41 permits gate 334 to pass a $t_5$ pulse thereby generating FT300 which gates the encoded instruction digits into the AU control. As in the case of the 90 instruction the 91 instruction constitutes a skip order insofar as the arithmetic unit is concerned. The remaining events involving the call from C2 Call flip-flop 350 the inhibiting of a call from C1 Call flip-flop 314 and the restoration of a regular sequence of events take place as in the 90 instruction and may be compared thereto with the aid of the timing diagram of FIGURES 6 and 7.

When a tracing digit has been detected by the masking arrangement of addressable storage elements, the effect becomes similar to that produced by the programming of a 91 instruction discussed hereinabove. However, it is desirable to discuss, first of all, the actual masking operation and detection thereby of the tracing digit. As this point it will be assumed that a previously programmed 97 instruction has been effective to set an addressable flip-flop 21, i.e., 371–21 in FIGURE 3. As long as instructions continue to appear which contain in their tracing digit position any digit other than 1, assuming flip-flop 371–21 to be the only one set, the computer continues to operate in its regular sequence of extraction and execution of instruction. However, the first instruction in this regular sequence having a 1 for a tracing digit is not executed. Referring to FIGURE 1*a* it will be observed that when such instruction is set up in IR–1 the tracing digit position thereof will be decoded by decoder 161 into nine output lines. These nine output lines are each representative of a different tracing digit and will be henceforth referred to as lines CVAT 1–9 inclusive. From FIGURE 3 it will be observed that CVAT–1 corresponding to tracing digit 1 is applied to gate 372–1 along with the output of previously set flip-flop 371–21. The output of gate 372 is applied to a buffer 373. Each of flip-flops 371–21 to 371–29 is similarly provided with a gate and these remaining gates are effective to pass CVAT–2 to CVAT–9 respectively when enabled by the corresponding flip-flops. The output of each gate (372–2 to 372–9) is similarly applied to the input of buffer 373. The output of buffer 373 is applied as an enabling signal to gate 374 to pass a $t_3$ timing pulse thereby setting ED flip-flop 375 at $t_4$. The output of gate 374 is also applied to the input of gate 380 along with CVAT–1 and the output of gate 380 is applied to set input of tracing flip-flop 376. Tracing flip-flop 376 constitutes one of nine tracing flip-flops one of which will be set in accordance with the detected tracing digit. In the interests of simplicity only one tracing flip-flop 376 has been shown. However, it is to be realized that in this embodiment in actuality nine such tracing flip-flops will be provided each being controlled by a different CVAT signal. Each of these will be provided with inputs gates similar to gate 380. It will be apparent from the foregoing that the detecting of a tracing digit by the masking apparatus of addressable flip-flops 371–21 to 371–29 will be effective upon the receipt of a tracing digit to set one only of the nine tracing flip-flops represented by flip-flop 376.

Consider now the effect produced by the setting of ED flip-flop 375. It is apparent that this flip-flop 375 will be set upon the detection by the masking apparatus of any tracing digit. The set output of ED flip-flop 375 is connected to gates 353 and 354. The set output of flip-flop 375 enables gate 353 to pass a $t_5$ pulse to generate signals FT315, FT316, FT425, and FT411. Gate 354 is also enabled by the set output of flip-flop 375 to pass a $t_7$ pulse to generate FT311 and FT363. It will be further noted that the input signal to the ED flip-flop 375 (i.e., the output of gate 374) is applied to the reset input of B Mod. flip-flop 323. The necessity for this will become apparent as the description proceeds.

Refer now to FIGURE 10 which is the timing diagram for the sequence of events occurring upon detection of the tracing digit by the masking arrangement of addressable flip-flops 162. As in the case of any programmed instruction the instruction containing the tracing digit is called for by passing the contents of the first control counter 104 through the B adder, augmenting such contents by 1 and addressing the memory via the address decoder 141. At $t_2$ of the second minor cycle the memory contents representing the new instruction containing the tracing digit therein are available on the high speed read bus and at $t_3$ the instruction will be set up in IR–1. Since by this time TA flip-flop 321 will be producing a set output signal at $t_0$ of the second minor cycle it is evident that gate 322 will pass a $t_2$ timing pulse to generate signals FT320 and FT432. These signals FT320 and FT432 enable the reading in of the instruction to IR–1 and at the same time effect a reading in of the B digits of that instruction into the addressable register selector registers 118. In addition the signal FT432 will be effective to set the B Mod. flip-flop 323 at time $t_3$ to perform a B modification as in any normal instruction. However, when a tracing digit is detected and an output is produced by gate 374 the normal B modification must be deleted. Accordingly, with the sensing of the tracing digit via gate 372 by the application thereto of CVAT–1 (assuming the tracing digit to be a 1 and assuming flip-flop 371–21 to have been previously set) at $t_3$, gate 374 will place a signal on the reset input to B Mod. flip-flop 323. B Mod. flip-flop 323 produces a set output under these circumstances for one pulse time only at time $t_3$. Since none of the gates controlled by B Mod. flip-flop 323 receive timing signals prior to $t_5$ it is evident that this momentary setting of the B Mod. flip-flop will have no effect. However, since the addressable registers have actually been addressed for a B modifier operand it is necessary to provide for their regeneration. For this reason at $t_5$ FT425 is generated via gate 353 in response to the setting of the ED flip-flop 375.

Consider now the effects which will occur upon the detection of the tracing digit. In addition to FT425, signals FT315, FT316 and FT411 are all generated by a $t_5$ pulse applied to gate 353 following setting of ED flip-flop 375. FT315 is applied to IR–2 and is effective when so applied to place signals upon the flip-flops constituting the I and A portions of IR–2 corresponding to coded decimal digits 9100. That is to say, signal FT315 is applied to the set and clear inputs of each of the flip-flops forming the I and A portions of IR–2 so that following such application the number appearing in IR–2 is 9100. This then in effect constitutes the generation of a new order by the computer and the stuffing of such order into the instruction register IR–2.

At the same time $t_5$ FT316 and FT411 are applied to the B-adder 139. Signal FT316 enables gate 177 to pass the contents of register 178 into input 1 of the B-adder. Register 178 contains therein the coded equivalent of 02600. As in previous instances FT411 gates zeros into input 2 of the B-adder.

Thus, at $t_6$ of the second minor cycle a 91 instruction is set up in IR–2 having been generated by FT315, the coded decimal value 02600 along with zeros is set up in the B adder. The 9100 instruction as generated operates from here on similarly to the 91 instruction as programmed, and which has previously been discussed with reference to FIGURE 7. Thus, the decoding of the newly generated (91) instruction by the instruction decoders and program counter decoder 207 of FIGURE 2 again gives rise to the CHWM signal providing for a memory write. At $t_7$ of the second minor cycle gate 326 is not enabled to generate FT363 because of the resetting of B Mod. flip-flop 323. However, FT363 will be generated from ED flip-flop 375, at $t_7$ via gate 354. Thus, the memory is addressed at the specific location 02600. Also at $t_7$ of the second minor cycle FT311 is generated via gate 354. From reference to FIGURE 1*a* it will be seen that FT311 enables the output of the B adder 139 to be gated into IR–2 via gate 105. Accordingly, memory address 02600 has been selected for a write operation and at the same time 02600 is placed in section 108 of IR–2.

The CHJP signals effective during the third minor cycle are precisely the same as when the 91 instruction was programmed. Accordingly, at $t_1$ FT401 and FTUA are generated from gate 355 and at $t_3$ FT351 is generated from gate 356. These signals, as in the previous instance, are effective to increase the present contents of the first control counter 104 ($n$) by one and read the thus increased contents ($N+1$) onto the high speed write bus HSB–W along with a 90 order from the register 166 in the most significant digit positions. It will be appreciated that the formulated computer word (090 00 00 $N+1$) will be stored, i.e., written in memory location 02600. Furthermore, at $t_3$ gate 357 is enabled by CHJP 09 to generate FT402 and FTUA while at $t_5$ gate 358 is enabled to generate FT346. FT402 and FTUA signals as in the previous case increase the contents of the M portion 108 of IR–2 by one in the B-adder, while FT346 places the thus increased M digits (in this case 02601) into the second control counter 106. Accordingly, following these operations the second control counter 106 will be set up to address the memory from location 02601 for the next instruction while the address plus 1 (i.e., $N+1$) of the instruction having the detected tracing digit will have been placed into memory location 02600.

The next instruction to be placed into IR–1 is that located at memory location 02601. This, in a diagnostic routine such as is presently contemplated in connection with the foregoing operation may constitute a test instruction and may take the form 095 AA 00 MMMMM. Before discussing the general application of each of these instructions and its specific use in a diagnostic routine, reference is made to FIGURE 9 which shows the timing associated with the test instruction 95.

The 95 instruction is a conditional transfer; that is to say where a certain event has occurred a jump or transfer will take place into a new routine. Where such an event has not occurred no such transfer will take place. The 95 instruction requires that the addressable flip-flop (e.g., flip-flop 376) designated by the A digits thereof be examined. If such addressable flip-flop is found to be set the transfer of control takes place to the M digits of the 95 instruction specifying the testing. If on the other hand the flip-flop to be tested was in a reset condition then the computer proceeds to the next instruction in the normal routine.

From an examination of FIGURE 3 it will be seen that apparatus is provided to carry out the aforementioned tests. Such apparatus is shown on FIGURE 3 as gate 378 which receives enabling signals from the set condition of a particular flip-flop with which it is associated. In this case gate 378 will receive further enabling signals from lines designated in this case as CHSR–3 and CHST–1, which lines as previously discussed are decoded via decoder 163 from selector storage 113 shown on FIGURE 1*a*. Tracing flip-flop 376 as previously mentioned is representative of an entire series of flip-flops which in the present embodiment of the invention may be nine flip-flops altogether. These correspond to each of the nine tracing digits. These flip-flops 376 are addressable to the extent that their condition may be tested when an appropriate test instruction (95) has been received effective to generate the necessary function table signals. They are not addressable in the same manner as flip-flops 371–21 to 371–29 which are addressable in the sense that they may be set or reset by a specific designated instruction (97, 96). When one of the tracing flip-flops as represented by flip-flop 376 is to be tested, the 95 test instruction is supplied by the operator in a routine stored in the memory so as to appear in IR–1. As previously described such routine may be a portion of the routine stored at memory location 02601 and which will be derived upon detection of a tracing digit in a previous instruction by the set condition of one of flip-flops 371–21 to 371–29.

The set condition of tracing flip-flop 376 upon being detected by the test instruction is effective to produce a signal output on gate 378 or one of the gates represented thereby so as to derive the next succeeding call for an instruction from the second control counter 106 by the setting of C2 Call flip-flop 350, as in the case where an unconditional transfer (i.e., 90–91 orders) is to be performed. In addition a signal output from gate 378 is effective to reset flip-flop 376. Similar reset paths are provided for each flip-flop represented by flip-flop 376.

For a more detailed explanation of the occurrence of events refer to FIGURE 9. It will be observed that, as in the case of any other instruction, a call for the 95 instruction takes place via the B-adder 139 and the address decoder 141. At $t_3$ of the second minor cycle the instruction is set up in IR–1 and the normal B modification is performed thereon. The 95 instruction in a manner similar to the 97 instruction previously described employs the A digits to designate which of the addressable flip-flops is to be tested. Assume that in the present instance tracing flip-flop 376 is given the address of 31 and that such flip-flop is in its set condition by virtue of a tracing digit 1 having been detected in the previous instruction by the set condition of flip-flop 371–21. As in the normal routine for any instruction, at $t_6$ of the second minor cycle the I and A digits will be set up in sections 107 and 107A respectively of IR–2 and the M digits will be set up in section 108 of IR–2 at $t_0$ of the third minor cycle. Again, during the third minor cycle a number of CHJP signals will be effective as previously described in connection with FIGURE 2. In the present instance, CHJP signals 26, 57, 23, 80, and 41 are generated. At $t_3$ of the third minor cycle CHJP 26 is effective to generate FT402 and FT411 via gate 361. Subsequently at $t_5$ CHJP 26 generates FT346 via gate 362. From FIGURE 9 and FIGURE 1*a* it will be seen that FT402 and FT411 are effective to add zeros to the M digits stored in section 108 of IR–2. FT346 places such M digits into the second control counter 106 so that such M digits are actually set up in the second control counter at $t_6$ of the third minor cycle. At $t_4$ of the third minor cycle CHJP 57 is effective to generate FT403 and FT411 via gate 329. These signals place the A digits contained in Section 107A of IR–2 into the B adder along with zeros so as to set up the B-adder at $t_5$ of the third minor cycle. CHJP 80 is applied via buffer 335A to gate 335 which is enabled at $t_6$ to generate FT421. FT421 gates the output of the B-adder 139 comprising the A digits into selector storage 113 via gate 112. At $t_5$ of the third minor cycle CHJP 41 generates FT300 via gate 334. This as in the case of the other instructions discussed hereinabove enables gate 132 to pass the encoded instruction digits into AU control 130 where they specify a skip order. CHJP 23 enables gate 347 to pass a $t_5$ pulse to set CNAA flip-flop 1 (348) so that at $t_6$ flip-flop 348 will produce its set output signal.

The A digits now in selector storage 113 are decoded by decoder 163 so as to produce outputs on lines CHSR–3 and CHST–1. Since it has already been stipulated that tracing flip-flop 376 is set, it will be evident that at $t_2$, flip-flop 376 will actually be tested. In view of the set condition of flip-flop 376 an output is obtained from gate 378 which is applied to reset flip-flop 376 and as well to buffer 385 and from there to gate 349. Gate 349 is connected to C2 Call flip-flop 350 via buffer 350A and is enabled by the set condition of flip-flop 348 to pass a $t_2$ timing pulse and thereafter set C2 Call flip-flop 350. With the setting of C2 Call flip-flop 350 the same sequence of events occurs as in the case of the previously discussed unconditional transfer instructions. Thus, C1 Call flip-flop 314 is inhibited from setting and the M digits of the 95 test instruction presently stored in the second control counter 106 are sent through the B-adder 139 to address decoder 141 so as to address the memory for an ensuing instruction.

It is evident that if upon receipt of the test instruction the designated tracing flip-flop had not been found to be set, no signal would be sent to gate 349. Accordingly, C2 Call flip-flop 350 would not be set and the call for the ensuing instruction would come from the first control counter 104 by the normal setting of C1 Call flip-flop 314. This, of course, would be instruction in the regular sequence of instructions. Consider now how the foregoing series of instructions may be utilized in transferring the computer into a diagnostic routine. Suppose, for example, a diagnostic routine involving tests and displays of various registers has been stored by the operator at memory location 10,000. It is further assumed that these particular test instructions are associated with a particular routine involving add orders. Such add orders might, for example, be provided with 1 for a tracing digit. Herein is pointed out that it may not be desirable to trace all of the add orders occurring within a given routine but only certain selected add orders. The add orders where no tracing is desired would not be tagged with any detectable tracing digit. The operator would be required to set flip-flop 371–21 and this setting would be accomplished by providing a 97 order which would appear as 97 21 00 00000. As hereinabove described when this instruction is received by the machine, addressable flip-flop 21 (identified in FIGURE 3 as 371–21) would be set. Thereafter any instruction appearing in the normal course of events but having 1 for a tracing digit would not be executed but rather would be effective to cause the computer to generate an instruction taking the form 91 00 00 02600. With the generation of this latter instruction and as described hereinabove the address of the instruction bearing the tracing digit would be increased by one and stored at memory location 02600. The M digits (02600) of the generated instruction would be increased by one and sent to address the memory for the instruction located at 02601.

The memory beginning at location 02601 will have stored therein a series of test instructions, i.e., 95 instructions. Thus, at 02601 would be stored an instruction 95 31 00 10000. The effect of this instruction when extracted from the memory and placed into IR–1 is as previously described with reference to FIGURE 9. It will be recalled that flip-flop 31, i.e., 376, in FIGURE 3 is set by the appearance on its input gate 380 of a CVAT–1 coincidental with the set output on one of the adressable flip-flops 371–21. The set output of flip-flop 31, i.e., 376 is applied to gate 378 along with the CHSR–3 and CHST–1 signals effective at $t_2$. The output thus produced by gate 378 causes the setting of the C2 Call flip-flop 350 and resetting of flip-flop 376, in the manner previously described. Accordingly, a jump takes place to memory location 10000 wherein is stored the desired test routine associated with tracing digit 1 in the manner described in connection with instruction 95. If tracing flip-flop 31, i.e., 376 in FIGURE 3 is found in its reset condition then the next instruction in the normal sequence would be called for. This could be another 95 or test instruction which would test the second tracing flip-flop not specifically shown in FIGURE 3. Similarly, an entire series of test or 95 instructions may be provided starting at memory location 02600 so that each of the nine tracing flip-flops represented by flip-flop 376 is tested in turn. When one such flip-flop has been found in its set condition, a transfer of control will take place to the memory location designated by the test instruction.

Alternate provisions may be made for testing. Thus, it is possible to provide only one tracing flip-flop such as 376. Thereafter, however, when such tracing flip-flop has been tested and found set by a 95 instruction, it will be necessary to provide in the M digits of the 95 testing instruction associated therewith an address designating a memory location where a further sub-routine will be found. From such sub-routine it will be possible to refer back to the memory location 02600 where the address plus one ($N+1$) of the instruction having the particular tracing digit under consideration is located. Further instructions may subtract 1 from $N+1$ and thereafter extract instruction N from the memory and examine and compare its tracing digit thereby to generate a further transfer of control. Such further transfer of control is to the memory location providing the test routine associated with that particular tracing digit.

The automatic generation of the 91 instruction heretofore associated with the detection of a tracing digit may in further embodiments be generated upon the detection of machine errors. For example, one error detecting flip-flop could be associated with error detecting circuits in an adder in the arithmetic unit. Another such flip-flop could be associated with circuits for detecting overflow during a multiplying operation. Thus, the error flip-flops would be used in the detection both of machine breakdowns and programming errors.

Each such error flip-flop would have its set output terminal provided with a testing gate arrangement similar to that of gate 378 associated with tracing flip-flop 376. Each error flip-flop would likewise be assigned a unique address within the array 162 of addressable flip-flops. In providing for the additional logic necessary for error detection it is necessary to arrange for the setting of ED flip-flop 375 at the proper time during the machine cycle. For this purpose a chain of error delay flip-flops would be arranged to operate in conjunction with the TA flip-flop 321, TB flip-flop 328 and TC flip-flop 365. With such an arrangement an error detected during any of the four cycles of operation may be properly timed to set ED flip-flop 375 during the proper cycle. With the setting of ED flip-flop 375 the 91 instruction would be generated thereby effecting the same transfer of control to memory location 02601 previously associated with the tracing routine. Thereafter a series of 95 instructions would be provided arranged to test each of the error flip-flops in turn. With each error flip-flop would be associated an error routine in the memory. If no errors were found then the tracing flip-flop 376 itself is tested and if found set, tracing of the subroutine would thereafter be carried out.

It is to be noted that, in connection with the 91 instruction whether generated by the computer itself or programmed, when the address of the instruction as augmented by one is sent to the memory a 90 instruction is sent along with it from register 166 as shown in FIGURE 1. This has the specific purpose of enabling the operator to return to the normal routine following a tracing routine or a programmed 91 order. Thus, the tracing routine or the programmed routine associated with the programmed 91 order would be terminated with an instruction taking the form 90 00 00 02600. As will be apparent from the preceding discussion of the 90 instruction the instruction then located at 02600 would be placed in IR–1 and executed. However, if the instruction located at location 02600 is another 90 instruction containing in its M digits the original address plus 1 ($N+1$) of the instruction which initiated the original transfer, it is apparent that by inserting the 90 digits along with $N+1$ into the memory one is enabled following the execution of a sub-routine to return to the original routine.

Having considered the general overall operation of the computer with respect to the instructions used to provide various conditional and unconditional jumps in diagnostic and testing routines and having considered the operation and function of some of the elements forming the circuits of the general block diagrams it is now proposed to examine in detail some of the components forming the computer.

In general, such components are, in themselves, well known elements at least as regards their logical design and operation. Thus, for example, FIGURE 1*a*, in addition to showing a memory, also illustrates a number of blocks indicating registers, counters and an adder.

The registers, such as IR–1 (101) or IR–2, shown by blocks 107 and 108, may comprise a parallel array of flip-flops each such flip-flop storing one binary digit wherein instruction register 101 would comprise sixty such flip-flops thereby to store sixty binary digits (5 bits for each of 12 decimal digits, the code representation being, for example, a 5–4–2–1 code with the most significant bit serving as an odd-even check) which are applied thereto. The second instruction register formed by blocks 107 and 108 could similarly be formed from a plurality of flip-flops in this case, however, forty-five such flip-flops (5 for each of 9 decimal digits) would be required. Since the second instruction register does not store either the B digits or the digit occurring in the most significant digit position (T digit) it will be evident that only forty-five flip-flops will be required in this particular instance. In this latter regard it should be noted that the portion 107 of instruction register 2 may comprise twenty such flip-flops and the portion 108 may comprise twenty-five such flip-flops. Both instruction registers may be cleared by the function table signals allowing new information to be read in.

The register selector register 118 may also comprise a plurality (10) of flip-flops to store either A or B digits (2 decimal digits) of an instruction representing the address of an addressable register to be selected. Also selector storage 113 may comprise a plurality (10) of flip-flops for storing the address (2 decimal digits) of an addressable register 121 which will eventually be selected to receive a result. Selector storage 113 is cleared by a $t_6$ pulse applied thereto.

The two control counters 104 and 106, respectively, may also comprise registers. Such registers may be considered as representing the accumulator portion of a counter. The entire counter is obtained through the combination of these particular registers with the B-adder 139. Again these particular registers may comprise an array of flip-flops each register capable of storing five decimal digits which in the present case correspond to twenty-five binary digits. The control counters are cleared when new information is read into them and such clearing may be accomplished by the same function table signal causing a read in thereto.

The B-adder 139 comprises a parallel adder capable of accommodating five decimal digits on each input. Pulse formers are provided in the input stage and the output stage of the B-adder whereby a delay of two pulse times is incurred in the addition of two numbers therein. Adders themselves are well-known in the prior art and it is not thought to be necessary in the present instance to specify the design of such an adder in any substantial detail. For details of varoius suitable types of adders regarding the logical design thereof, reference is made to Chapter 8 in the textbook "Arithmetic Operations in Digital Computers," by R. K. Richards (Van Nostrand) and also to Chapters 4 and 13 in the textbook, "High Speed Computing Devices," by the staff of the Engineering Research Associates, Inc. (McGraw-Hill).

Decoders and encoders have been discussed generally in connection with some of the more detailed circuits described hereinabove. A decoder comprises a gating array wherein a plurality of input and output lines are provided so that the simultaneous application of signals to a plurality of said input lines results in an output from a predetermined one of the output lines. An encoder comprises a buffing array having a plurality of input and output lines wherein the application of a signal to one of the input lines results in outputs from a predetermined plurality of the output lines. Thus, the fast register selector decoder 120 may comprise a gating matrix enabling the selection of any one of the addressable registers 121. Similarly, the address decoders 141 may likewise be formed by gating matrices of the type described. Suitable forms of these are well known to those skilled in the art.

The addressable registers, as in the case of other registers, may be considered as comprising in each case sufficient flip-flops, i.e., sixty to store a complete computer word and to enable a parallel read-in and read-out of such computer word.

It will be realized that in order to provide a complete computer many additional gates will have to be provided other than those already specifically shown. However, again in the interests of simplicity and ready understandability, such gates have not been specifically shown on the drawings except where they are especially necessary for following through an instruction with proper timing of entries and exits to the various components employed in such instruction.

Figure 4:
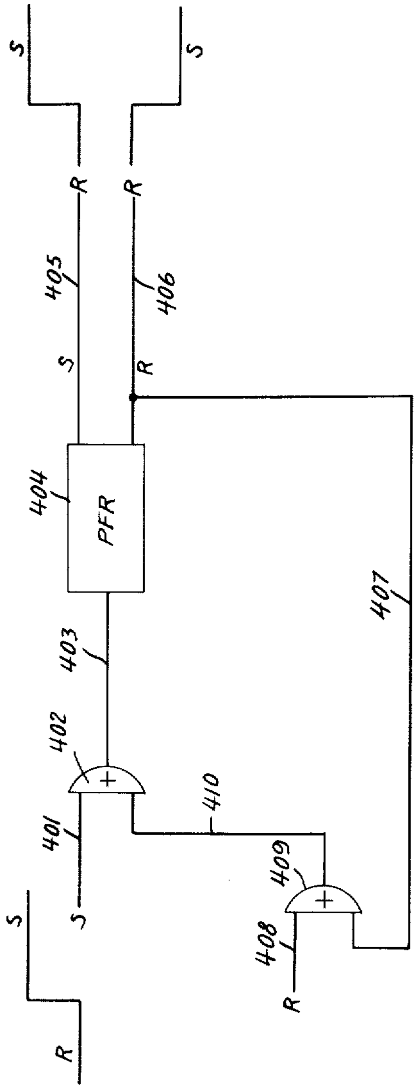
FIGURE 4 is a diagrammatic representation of a flip-flop of the type used in the present invention wherein a set signal always takes precedence over a reset signal.

If reference is made to FIGURE 3, it is apparent that a $t_5$ pulse will be applied to both the set input and the reset input of the flip-flop 348 . This flip-flop and others expected to receive similarly timed inputs to both the set and reset inputs thereof are so designed that the application of a set input thereto will always set the flip-flop notwithstanding the simultaneous appearance of a pulse upon the reset input line. FIGURE 4 shows a typical design for a flip-flop which may be employed within the present invention.

An input line 401 feeds a buffer inverter 402 in FIGURE 4. Reset input line 408 is likewise shown feeding a buffer inverter 409. Such buffer inverters may be formed from transistors for example as shown in U.S. application No. 673,224, now U.S. Patent No. 2,949,543. Issued, August 16, 1960, and are characterized in that for any input exhibiting a relatively high level an output will be produced therefrom at a relatively low level. If all inputs, however, are at a low level an output at a relatively high level will be produced. The pulse former amplifier 404 to which the output from buffer inverter 402 is fed by way of line 403 is likewise an inverter whereby high level inputs applied thereto will result in low level outputs on the set output line 405 and will be complemented to produce a corresponding high level output on reset output line 406. A feedback path 407 is provided by the output line 406 from pulse former 404 and a further input to buffer inverter 409.

Considering the operation of FIGURE 4 it is assumed that the normal potential levels on set input line 401 and reset input line 408 will be low. Now if a pulse in the form of a step to a substantially higher potential level is applied to inverter 402 a low level output will appear on line 403. This low level output is applied to pulse former 404 and appears on set output line 405 as a high level and at the same time on reset output line 406 as the corresponding oppositely directed level. The output from reset line 406 upon being fed back along line 407 is applied to buffer inverter 409. Since the other signal applied to buffer inverter 409 is normally at a low level it is apparent that a high level output will appear on line 410. This, in turn, is subsequently inverted by inverter 402 and it appears as a further low level input at pulse former 404 whereby the high level initiated by the application of a pulse to input line 401 results in a high level output on set line 405.

Because of the fact that element 402 provides an inverting function it will be apparent that further high level signals appearing on line 401 will have no further effect on the output of line 405 which will remain high. It is further apparent that if simultaneous high level inputs are applied to both set and reset lines 401 and 408, the inputs to buffer 402 are respectively high and low. However, the high level signal will prevail and will be inverted to produce the low level signal on line 403.

However, if in the absence of a high level signal on set input line 401, a high level input is applied to reset line 408, it will be apparent that a low level signal from inverter 409 will appear on line 410. The presence of a low level signal on input 401 and on line 410 will cause inverter 402 to provide a high level output on line 403. The high level input to pulse former 404 will thereafter produce a low level output on set output line 405 and a high level signal on the reset output line 406. Thus the flip-flop will be reset.

Many more examples of the application of the present invention will suggest themselves to programmers and others skilled in the art. It is also apparent that alternative methods of accomplishing the invention may suggest themselves to those skilled in the art nothwithstanding the fact that only one specific example of apparatus has been set forth. Accordingly, the scope of the present appplication is only limited to the extent of the claims attached hereto.

What is claimed is:

1. In a stored program digital computer comprising a memory for storing instructions and data, an arithmetic unit for performing operations on said data in response to said instructions, sequencing means for extracting instructions from said memory in a predetermined order, and control means responsive to extracted instructions to derive control signals for controlling both the operation of the arithmetic unit and the succeeding sequence of instructions, the improvement which comprises a presettable masking means capable of being readily turned on and off effective to determine the presence of any one of a plurality of digits which may occur at a certain location in an instruction word when turned on and to ignore the presence of any one of said plurality of digits which may occur at a certain location in an instruction word when turned off and means associated with said masking means effective upon detection of any of said digits to generate a new instruction, said new instruction replacing an instruction extracted from the memory in a normal sequence of events.

2. In a computer according to claim 1 the improvement wherein said new instruction alters the operation of said sequencing means thereby to initiate a new sequence of instructions.

3. A computer according to claim 1 wherein said masking means comprises a plurality of switches each having a unique address associated therewith, preassigned digits within an instruction word relating to the addresses of said switches.

4. A computer according to claim 3 wherein said switches comprise bistable storage elements.

5. A digital computer comprising a memory for storing instruction and data words, means for extracting instruction words from said memory in a predetermined sequence, at least one register means for storing an instruction word following extraction thereof from said memory, a control unit connected to said register means and responsive to certain digits of said instruction word stored in said register means thereby to derive control signals, an arithmetic means associated with a plurality of addressable registers, certain digits of said instruction word stored in said register means being associated with said addressable registers, a plurality of addressable switches each providing a set and a reset condition, certain digit positions of said instruction word stored in said register means being associated with said addressable switches, and detecting means jointly associated with said addressable switches and a certain further digit of said instruction word stored in said register means, said detecting means generating a signal upon the coincidence of said certain further digit with the set condition signal of an associated one of said addressable switches thereby to condition said control unit to generate a new instruction word in said register means.

6. The digital computer of claim 5 wherein said means for extracting instruction words from the memory is controlled by said new instruction word thereby to exchange the sequence of instructions subsequently to be extracted from said memory from said predetermined sequence.

References Cited by the Examiner

UNITED STATES PATENTS

| | | | |
|---|---|---|---|
| 2,898,041 | 8/59 | Crowley et al. | 235—157 |
| 2,978,175 | 4/61 | Newman et al. | 235—157 |
| 3,047,228 | 7/62 | Bauer et al. | 235—457 |
| 3,048,332 | 8/62 | Brooks et al. | 235—157 |
| 3,105,143 | 9/63 | Hosier et al. | 235—157 |

MALCOLM A. MORRISON, *Primary Examiner.*

CORNELIUS D. ANGEL, ROBERT C. BAILEY, *Examiners.*